US012810154B2

(12) United States Patent
Farsarakis et al.

(10) Patent No.: US 12,810,154 B2
(45) Date of Patent: Nov. 24, 2026

(54) NEURAL NETWORK TRAINING AND INFERENCE WITH HIERARCHICAL ADJACENCY MATRIX

(71) Applicant: Intel Corporation, Santa Clara, CA (US)

(72) Inventors: Emmanouil Ioannis Farsarakis, Livingston (GB); Robert Benke, Sopot (PL); Michal Krzysztof Szarmach, Gdynia (PL); Andrea Zanetti, Gdansk (PL)

(73) Assignee: Intel Products IP LLC, Santa Clara, CA (US)

( * ) Notice: Subject to any disclaimer, the term of this patent is extended or adjusted under 35 U.S.C. 154(b) by 0 days.

(21) Appl. No.: 18/325,348

(22) Filed: May 30, 2023

(65) Prior Publication Data

US 2023/0385641 A1 Nov. 30, 2023

Related U.S. Application Data

(60) Provisional application No. 63/479,604, filed on Jan. 12, 2023.

(51) Int. Cl.
*G06N 3/08* (2023.01)
*G06F 17/16* (2006.01)

(52) U.S. Cl.
CPC ............... *G06N 3/08* (2013.01); *G06F 17/16* (2013.01)

(58) Field of Classification Search
CPC ................................. G06N 3/08; G06F 17/16
See application file for complete search history.

(56) References Cited

U.S. PATENT DOCUMENTS

2020/0285944 A1* 9/2020 Lee ......................... G06F 17/10
2020/0356858 A1* 11/2020 Hegde ............... G06F 18/23213
2020/0388384 A1* 12/2020 Kunitomi .............. G16H 70/60

OTHER PUBLICATIONS

Accurate, Efficient and Scalable Training of Graph Neural Networks written by Hanging Zeng, Oct. 8, 2020 (Year: 2020).*

* cited by examiner

*Primary Examiner* — Hau H Hoang
(74) *Attorney, Agent, or Firm* — Akona IP PC

(57) ABSTRACT

Hierarchical adjacency matrices of a graph may be generated for DNN training or inference. The graph includes nodes connected by edges. One or more target nodes may be selected from the graph. A hierarchical sequence of node groups may be formed. A node group may be a neighborhood in the graph. A first node group (e.g., 0-hop neighborhood) may include the target node(s). A subsequent node group (e.g., 1-hop neighborhood, 2-hop neighborhood, etc.) may include one or more nodes directly connected to any node of the previous node group in the hierarchical sequence. A hierarchical adjacency matrix may be generated based on the hierarchical sequence. The hierarchical adjacency matrix may include rows, each of which rows represents a respective node in the graph. The rows may be arranged in accordance with the hierarchical sequence. The hierarchical adjacency matrix may include elements encoding edges between the nodes in the node groups.

11 Claims, 14 Drawing Sheets

300

900

NEURAL NETWORK TRAINING AND INFERENCE WITH HIERARCHICAL ADJACENCY MATRIX

CROSS REFERENCE TO RELATED APPLICATION

This application claims the benefit of U.S. Provisional Patent Application No. 63/479,604, filed Jan. 12, 2023, which is incorporated by reference in its entirety.

TECHNICAL FIELD

This disclosure relates generally to deep neural networks (DNNs), and particularly DNN training and inference with hierarchical graph adjacency matrices.

BACKGROUND

DNNs are used extensively for a variety of artificial intelligence applications (such as recommendation systems, drug discovery, etc.) due to their ability to achieve high accuracy. However, the high accuracy comes at the expense of significant computation cost. DNNs have extremely high computing demands as each inference can require hundreds of millions of operations as well as a large amount of data to read and write. Therefore, techniques to improve efficiency of DNNs are needed.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Overview

Figure 1:
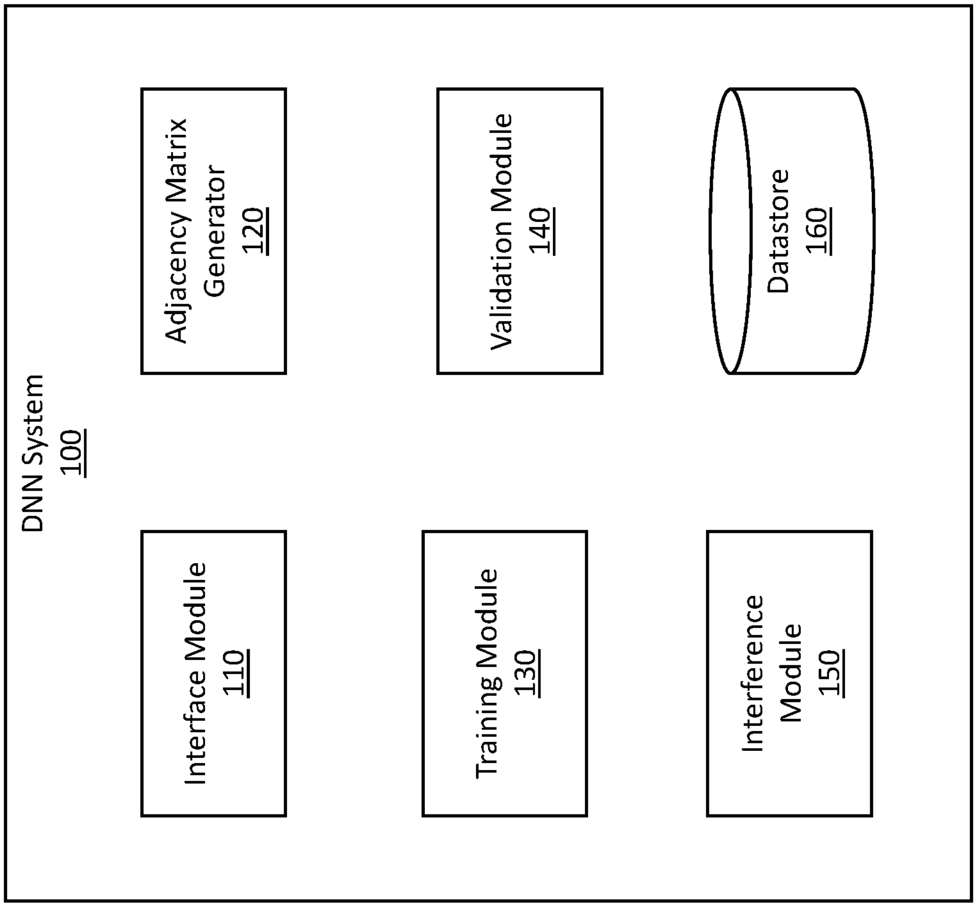
FIG. 1 illustrates a DNN system, in accordance with various embodiments.

DNN training process usually has two phases: the forward pass and the backward pass. During the forward pass, training samples with ground-truth labels (e.g., known or verified labels) are input into the DNN and are processed using the internal parameters of the DNN to produce a model-generated output. In the backward pass, the model-generated output is compared to the ground-truth labels of the training samples and the internal parameters are adjusted. After the DNN is trained, the DNN can be used for various tasks through inference. Inference makes use of the forward pass to produce model-generated output for unlabeled data.

In many applications, data input into DNNs for either training or inference can be large, causing significant burden of data transmission, storage, and computation. A solution is to make data pass DNNs with mini-batching and sampling. Taking a large graph for example, the nodes in the graph are usually processed in batches with limited neighborhood constraints. However, such a solution is not optimal as mini-batching and sampling can generate a larger memory footprint or more compute operations than the DNN algorithm requires.

Another solution is the bipartite graph approach, which creates multiple adjacency matrices, one for each neighborhood width required by the problem. Preparation of such bipartite subgraphs usually takes place during the sampling stage of training or inference. For each batch, a group of bipartite subgraphs which contain source and destination nodes needed for doing message passing for each layer are generated. During forward pass, for every iteration over graph convolution layers, each layer may use a dedicated bipartite subgraph. However, the bipartite subgraph solution suffers from a drawback that separate tensor (graph adjacency matrix) for each layer are created unnecessarily. Each bipartite graph contains source and destination nodes for specific layer where destination nodes for i-th layer becoming source nodes for i+1 layer. As information is duplicated, suboptimal amount of memory can be allocated. Even though the bipartite graph solution can help in reducing the computation part, it can increase the memory usage and each bipartite graph must be processed separately for the backwards pass.

An alternative solution is to simplify a graph as one adjacency matrix tensor. This solution can carry out all processing using the largest required neighborhood and omit results which are not required at the end of the forward or backward. The simplified implementation does not require complex and memory hungry group of bipartite subgraphs. However, the simplified implementation can result in significant unnecessary computation and extra memory usage for node's embeddings that are ultimately discarded.

Embodiments of the present disclosure may improve on at least some of the challenges and issues described above by introducing hierarchical adjacency matrices for DNN training and inference. DNNs can be trained to process data (e.g., image, text, social network, etc.) that can be represented as graphs. A DNN may be a graph neural network (GNN) or a neural network that includes a GNN. A graph may be a data structure comprising a collection of nodes and one or more edges. A node is an entity in the graph, and an edge is a connection of two nodes. A graph may be associated with one or more embeddings. For instance, the graph may have a graph embedding that encodes one or more characteristics of the graph, a node in the graph may have a node embedding that encodes one or more characteristics of the node, or an edge in the graph may have an edge embedding that encodes one or more characteristics of the edge. An embedding may be a vector, which is also referred to as embedding vector. A DNN may receive a graph and output an updated graph. The updated graph may be associated with updated embeddings. For instance, the DNN may output an update in a graph embedding, node embedding, or edge embedding.

In various embodiments of the present disclosure, a graph may be input into a DNN in multiple rounds for training or inference. Each round may be for updating one or more embeddings associated with a portion of the graph, i.e., a subgraph. For each round, a hierarchical adjacency matrix of the corresponding subgraph may be generated. To generate a hierarchical adjacency matrix, one or more target nodes are selected from the nodes in the graph. A target node may be a node associated with an embedding to be updated by the DNN in this round. Other nodes in the graph may influence the embedding of a target node, so additional nodes may also be selected for generating the hierarchical adjacency matrix. The embeddings of the additional nodes may not be updated by the DNN in this round.

In some embodiments, a breadth-first search approach may be used to identify the additional nodes from the graph. The search may start with searching for nodes that are directly connected to any of the target nodes. These nodes are referred to as 1-hop neighbors of the target nodes. Next, nodes that are directly connected to the 1-hop neighbors of the target nodes are identified, and they are referred to as 2-hop neighbors of the target nodes. This process may continue until the N-hop neighbors of the target nodes are identified. N is an integer that may be determined based on the number of layers in the neural network. In some embodiments, N is equal to the number of layers in the neural network.

A hierarchical adjacency matrix may be generated based on the identified nodes. The hierarchical adjacency matrix may be a two-dimensional matrix that includes elements arranged in rows and columns. Each row or column in the hierarchical adjacency matrix may correspond to a different node, and the identified nodes may be arranged in a sequence. For instance, the target nodes are placed first, followed by the 1-hop neighbors of the target nodes, further followed by the 2-hop neighbors of the target nodes, and so on. In an example where there are two target nodes, three 1-hop neighbors of the target nodes, and 10 2-hop neighbors of the target nodes, the first two rows or columns of the hierarchical adjacency matrix represent the target nodes, the next three rows or columns represent the 1-hop neighbors of the target nodes, and the next 10 rows or columns represent the 2-hop neighbors of the target nodes. Each element in the hierarchical adjacency matrix may have a zero value which generally indicates non-connectivity of the nodes of the corresponding row and corresponding column, or a non-zero value (e.g., one), which indicates connectivity between the corresponding nodes. The hierarchical adjacency matrix may be input into the DNN for a training or inference process. In some embodiments, different portions of the hierarchical adjacency matrix may be input into different layers of the DNN. For instance, the entire hierarchical adjacency matrix may be input into the first layer of the DNN. The hierarchical adjacency matrix excluding elements for the N-hop neighbors of the target nodes may be input into the second layer of the DNN. The hierarchical adjacency matrix excluding elements for the N-hop neighbors and (N−1)-hop neighbors of the target nodes may be input into the third layer of the DNN. This continues until the last layer, which will receive the elements corresponding to the target nodes and the 1-hop neighbors.

The present disclosure facilitates incorporation of hierarchy to the nodes in an adjacency matrix. Such an adjacency matrix may be generated based on a data structure by selecting defined continuous subsections of this data structure we can generate different sizes of neighborhoods around a selection of target nodes. This data structure can be used to optimize the training and inference processes of DNNs by mini-batching or sampling the input data. As different sections of this data structure can be used to generate adjacency matrices for different width neighborhoods, the present disclosure can reap the benefits of the solutions described above while at the same time eradicating the drawbacks of these solutions. Processing of nodes can be carried out on the nodes in the required neighborhood, while the memory footprint remains optimal. The present disclosure can improve the performance of processing units executing DNNs, such as central processing units (CPU), graphics processing units (GPU), and so on.

For purposes of explanation, specific numbers, materials and configurations are set forth in order to provide a thorough understanding of the illustrative implementations. However, it will be apparent to one skilled in the art that the present disclosure may be practiced without the specific details or/and that the present disclosure may be practiced with only some of the described aspects. In other instances, well known features are omitted or simplified in order not to obscure the illustrative implementations.

Further, references are made to the accompanying drawings that form a part hereof, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed or described operations may be omitted in additional embodiments.

For the purposes of the present disclosure, the phrase “A and/or B” or the phrase “A or B” means (A), (B), or (A and B). For the purposes of the present disclosure, the phrase “A, B, and/or C” or the phrase “A, B, or C” means (A), (B), (C), (A and B), (A and C), (B and C), or (A, B, and C). The term “between,” when used with reference to measurement ranges, is inclusive of the ends of the measurement ranges.

The description uses the phrases “in an embodiment” or “in embodiments,” which may each refer to one or more of the same or different embodiments. The terms “comprising,” “including,” “having,” and the like, as used with respect to embodiments of the present disclosure, are synonymous. The disclosure may use perspective-based descriptions such as “above,” “below,” “top,” “bottom,” and “side” to explain various features of the drawings, but these terms are simply for ease of discussion, and do not imply a desired or required orientation. The accompanying drawings are not necessarily drawn to scale. Unless otherwise specified, the use of the ordinal adjectives “first,” “second,” and “third,” etc., to describe a common object, merely indicates that different instances of like objects are being referred to and are not intended to imply that the objects so described must be in a given sequence, either temporally, spatially, in ranking or in any other manner.

In the following detailed description, various aspects of the illustrative implementations will be described using terms commonly employed by those skilled in the art to convey the substance of their work to others skilled in the art.

The terms "substantially," "close," "approximately," "near," and "about," generally refer to being within +/−20% of a target value based on the input operand of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the input operand of a particular value as described herein or as known in the art.

In addition, the terms "comprise," "comprising," "include," "including," "have," "having" or any other variation thereof, are intended to cover a non-exclusive inclusion. For example, a method, process, device, or system that comprises a list of elements is not necessarily limited to only those elements but may include other elements not expressly listed or inherent to such method, process, device, or systems. Also, the term "or" refers to an inclusive "or" and not to an exclusive "or."

The systems, methods and devices of this disclosure each have several innovative aspects, no single one of which is solely responsible for all desirable attributes disclosed herein. Details of one or more implementations of the subject matter described in this specification are set forth in the description below and the accompanying drawings.

Example DNN System

FIG. 1 is a block diagram of an example DNN system 100, in accordance with various embodiments. The DNN system 100 trains DNNs for various tasks, such as language processing, image classification, learning relationships between objects (e.g., people, biological cells, devices, etc.), control behaviors for devices (e.g., robots, machines, etc.), and so on. The DNN system 100 may use hierarchical adjacency matrices for training or inference of DNNs. The DNN system 100 includes an interface module 110, an adjacency matrix generator 120, a training module 130, a validation module 140, an inference module 150, and a datastore 160. In other embodiments, alternative configurations, different or additional components may be included in the DNN system 100. Further, functionality attributed to a component of the DNN system 100 may be accomplished by a different component included in the DNN system 100 or a different system. The DNN system 100 or a component of the DNN system 100 (e.g., the training module 130 or inference module 150) may include the computing device 1000 in FIG. 10.

The interface module 110 facilitates communications of the DNN system 100 with other systems. As an example, the interface module 110 supports the DNN system 100 to distribute trained DNNs to other systems, e.g., computing devices configured to apply DNNs to perform tasks. As another example, the interface module 110 establishes communications between the DNN system 100 with an external database to receive data that can be used to train DNNs or input into DNNs to perform tasks. In some embodiments, data received by the interface module 110 may have a data structure, such as a graph. A graph may include a collection of nodes, which are connected by edges. In an embodiment, a node may represent data about an object, such as a person, vehicle, tree, building, animal, and so on. In another embodiment, a node may represent data that is not about a particular object. For instance, a node may represent text.

A graph may be associated with an adjacency matrix. An adjacency matrix may be a two-dimensional matrix used to map the association between the nodes of a graph. The adjacency matrix may include elements arranged in rows and columns. Each row or column may represent a respective node in the graph. Each element in the graph may have a row index and a column index, which indicates the position of the element in the adjacency matrix. The value of the element may indicate whether the node represented by the row and the node represented by the column are connected by an edge.

The adjacency matrix generator 120 generates hierarchical adjacency matrices that can facilitate data to pass DNNs with mini-batching and sampling in training and inference processes. In some embodiments, the adjacency matrix generator 120 may generate a plurality of hierarchical adjacency matrices for a graph that is to be input into a DNN, e.g., a to-be-trained DNN or a trained DNN. Each hierarchical adjacency matrix may correspond to a different subset of the graph, i.e., a different subgraph and may be used to update one or more embeddings associated with one or more nodes in the subgraph. With the hierarchical adjacency matrices, the graph can pass the DNN in a plurality of mini-batches. In some embodiments, the adjacency matrix generator 120 may generate a plurality of hierarchical adjacency matrices based on an adjacency matrix of the graph.

The adjacency matrix generator 120 may generate a hierarchical adjacency matrix by identifying the corresponding subgraph, which includes one or more nodes that can be updated by the DNN by inputting the hierarchical adjacency matrix into the DNN. A node in the subgraph is referred to as a target node. The adjacency matrix generator 120 may further identify neighbors of each target node in a hierarchical manner. For instance, the adjacency matrix generator 120 first identifies one or more nodes that are directly connected with a target node, i.e., the 1-hop neighbors of the target node. The adjacency matrix generator 120 may further identify the 2-hop neighbors of each target node based on the 1-hop neighbors of the target node. This may continue until the N-hop neighbors of each target node are identified. N may be a predetermined number, which may equal the number of layers in the DNN.

The adjacency matrix generator 120 may further determine the rows and columns of the hierarchical adjacency matrix. The adjacency matrix generator 120 may first arrange the target node(s), followed by the 1-hop neighbors of the target node, then the 2-hop neighbors of the target node, and so on. The row or column representing a target node is referred to as a target row or column. The row or column representing a 1-hop neighbor of a target node is referred to as a 1-hop row or column. The row or column representing a N-hop neighbor of a target node is referred to as a N-hop row or column. As the connections of different nodes are different in the graph, the adjacency matrix generator 120 may generate different hierarchical adjacency matrices (e.g., hierarchical adjacency matrices having different sizes or different elements) for different subgraphs. Also, the number of target nodes in different hierarchical adjacency matrices may be different. The adjacency matrix generator 120 may provide the hierarchical adjacency matrices to the training module 130 or inference module 150. Certain aspects of the adjacency matrix generator 120 are described below in conjunction with FIG. 2.

The training module 130 trains DNNs by using training datasets. In some embodiments, a DNN may be a GNN or may be a neural network that includes a GNN. In some embodiments, a training dataset for training a DNN may include one or more graphs, each of which may be a training sample. The training module 130 may receive hierarchical adjacency matrices generated by the adjacency matrix generator 120 for the one or more graphs and form a training dataset with the hierarchical adjacency matrices. For instance, the training module 130 may input a hierarchical adjacency matrix into the DNN in each round.

In some embodiments, the training module 130 may input different data into different layers of the DNN. For instance, the training module 130 inputs the entire hierarchical adjacency matrix into the first DNN layer but inputs the hierarchical adjacency matrix excluding the elements in the N-hop rows and N-hop columns into the second DNN layer. For every subsequent DNN layer, the input data may be less than the previous DNN layer. This may continue till the training module 130 inputs the elements in the target rows and target columns as well as 1-hop neighbors into the last (e.g., the $N^{th}$) DNN layer. The DNN layers process the data and output an update in one or more embeddings associated with the hierarchical adjacency matrix. The training module 130 may adjust internal parameters of the DNN to minimize a difference between the embeddings output by the DNN and the ground-truth embeddings.

In some embodiments, a part of the training dataset may be used to initially train the DNN, and the rest of the training dataset may be held back as a validation subset used by the validation module 140 to validate performance of a trained DNN. The portion of the training dataset not including the tuning subset and the validation subset may be used to train the DNN.

The training module 130 also determines hyperparameters for training the DNN. Hyperparameters are variables specifying the DNN training process. Hyperparameters are different from parameters inside the DNN (e.g., weights of filters). In some embodiments, hyperparameters include variables determining the architecture of the DNN, such as number of hidden layers, etc. Hyperparameters also include variables which determine how the DNN is trained, such as batch size, number of epochs, etc. A batch size defines the number of training samples to work through before updating the parameters of the DNN. The batch size is the same as or smaller than the number of samples in the training dataset. The training dataset can be divided into one or more batches. The number of epochs defines how many times the entire training dataset is passed forward and backwards through the entire network. The number of epochs defines the number of times that the deep learning algorithm works through the entire training dataset. One epoch means that each training sample in the training dataset has had an opportunity to update the parameters inside the DNN. An epoch may include one or more batches. The number of epochs may be 1, 10, 500, 100, or even larger.

The training module 130 defines the architecture of the DNN, e.g., based on some of the hyperparameters. The architecture of the DNN includes an input layer, an output layer, and a plurality of hidden layers. The input layer of an DNN may include tensors (e.g., a multidimensional array) specifying attributes of the input image, such as the height of the input image, the width of the input image, and the depth of the input image (e.g., the number of bits specifying the color of a pixel in the input image). The output layer includes labels of objects in the input layer. The hidden layers are layers between the input layer and output layer. The hidden layers include one or more convolutional layers and one or more other types of layers, such as pooling layers, fully connected layers, normalization layers, softmax or logistic layers, and so on. The convolutional layers of the DNN abstract the input image to a feature map that is represented by a tensor specifying the feature map height, the feature map width, and the feature map channels (e.g., red, green, blue images include 3 channels). A pooling layer is used to reduce the spatial volume of input image after convolution. It is used between 2 convolution layers. A fully connected layer involves weights, biases, and neurons. It connects neurons in one layer to neurons in another layer. It is used to classify images between different category by training.

In the process of defining the architecture of the DNN, the training module 130 also adds an activation function to a hidden layer or the output layer. An activation function of a layer transforms the weighted sum of the input of the layer to an output of the layer. The activation function may be, for example, a rectified linear unit activation function, a tangent activation function, or other types of activation functions.

After the training module 130 defines the architecture of the DNN, the training module 130 inputs a training dataset into the DNN. The training dataset includes a plurality of training samples. An example of a training sample includes an object in an image and a ground-truth label of the object. The training module 130 modifies the parameters inside the DNN ("internal parameters of the DNN") to minimize the error between labels of the training objects that are generated by the DNN and the ground-truth labels of the objects. The internal parameters include weights of filters in the convolutional layers of the DNN. In some embodiments, the training module 130 uses a cost function to minimize the error.

The training module 130 may train the DNN for a predetermined number of epochs. The number of epochs is a hyperparameter that defines the number of times that the deep learning algorithm will work through the entire training dataset. One epoch means that each sample in the training dataset has had an opportunity to update internal parameters of the DNN. After the training module 130 finishes the predetermined number of epochs, the training module 130 may stop updating the parameters in the DNN. The DNN having the updated parameters is referred to as a trained DNN.

The validation module 140 verifies accuracy of trained DNNs. In some embodiments, the validation module 140 inputs samples in a validation dataset into a trained DNN and uses the outputs of the DNN to determine the model accuracy. In some embodiments, a validation dataset may be formed of some or all the samples in the training dataset. Additionally or alternatively, the validation dataset includes additional samples, other than those in the training sets. In some embodiments, the validation module 140 may determine an accuracy score measuring the precision, recall, or a combination of precision and recall of the DNN. The validation module 140 may use the following metrics to determine the accuracy score: Precision=TP/(TP+FP) and Recall=TP/(TP+FN), where precision may be how many the reference classification model correctly predicted (TP or true positives) out of the total it predicted (TP+FP or false positives), and recall may be how many the reference classification model correctly predicted (TP) out of the total number of objects that did have the property in question (TP+FN or false negatives). The F-score (F-score=2*PR/(P+R)) unifies precision and recall into a single measure.

The validation module 140 may compare the accuracy score with a threshold score. In an example where the validation module 140 determines that the accuracy score of the augmented model is lower than the threshold score, the validation module 140 instructs the training module 130 to re-train the DNN. In one embodiment, the training module 130 may iteratively re-train the DNN until the occurrence of a stopping condition, such as the accuracy measurement indication that the DNN may be sufficiently accurate, or a number of training rounds having taken place.

The inference module 150 applies the trained or validated DNN to perform tasks. The inference module 150 may run inference processes of a trained or validated DNN. For instance, the inference module 150 may input data into the DNN and receive an output of the DNN. The output of the DNN may provide a solution to the task for which the DNN is trained for. In some embodiments, the inference module 150 can enable data passing the DNN with mini-batching or sampling by inputting hierarchical adjacency matrices generated by the adjacency matrix generator 120 into the DNN. The inference module 150 may input different data into different layers of the DNN. For instance, the inference module 150 inputs the entire hierarchical adjacency matrix into the first DNN layer but inputs the hierarchical adjacency matrix excluding the elements in the N-hop rows and N-hope columns into the second DNN layer. For every subsequence DNN layer, the input data may be less than the previous DNN layer. This may continue till the inference module 150 inputs the elements in the target rows and target columns into the last DNN layer. The DNN layers process the data and output an update in one or more embeddings associated with the hierarchical adjacency matrix.

After the hierarchical adjacency matrices for a graph are processed by the DNN, the inference module 150 may aggregate the outputs of the DNN to generate a final result of the inference process. In some embodiments, the inference module 150 may distribute the DNN to other systems, e.g., computing devices in communication with the DNN system 100, for the other systems to apply the DNN to perform the tasks. The distribution of the DNN may be done through the interface module 110. In some embodiments, the DNN system 100 may be implemented in a server, such as a cloud server, an edge service, and so on. The computing devices may be connected to the DNN system 100 through a network. Examples of the computing devices include edge devices.

The datastore 160 stores data received, generated, used, or otherwise associated with the DNN system 100. For example, the datastore 160 stores hierarchical adjacency matrices generated by the adjacency matrix generator 120 or used by the training module 130, validation module 140, and the inference module 150. The datastore 160 may also store other data generated by the training module 130 and validation module 140, such as the hyperparameters for training DNNs, internal parameters of trained DNNs (e.g., values of tunable parameters of activation functions, such as Fractional Adaptive Linear Units (FALUs)), etc. In the embodiment of FIG. 1, the datastore 160 is a component of the DNN system 100. In other embodiments, the datastore 160 may be external to the DNN system 100 and communicate with the DNN system 100 through a network.

Figure 2:
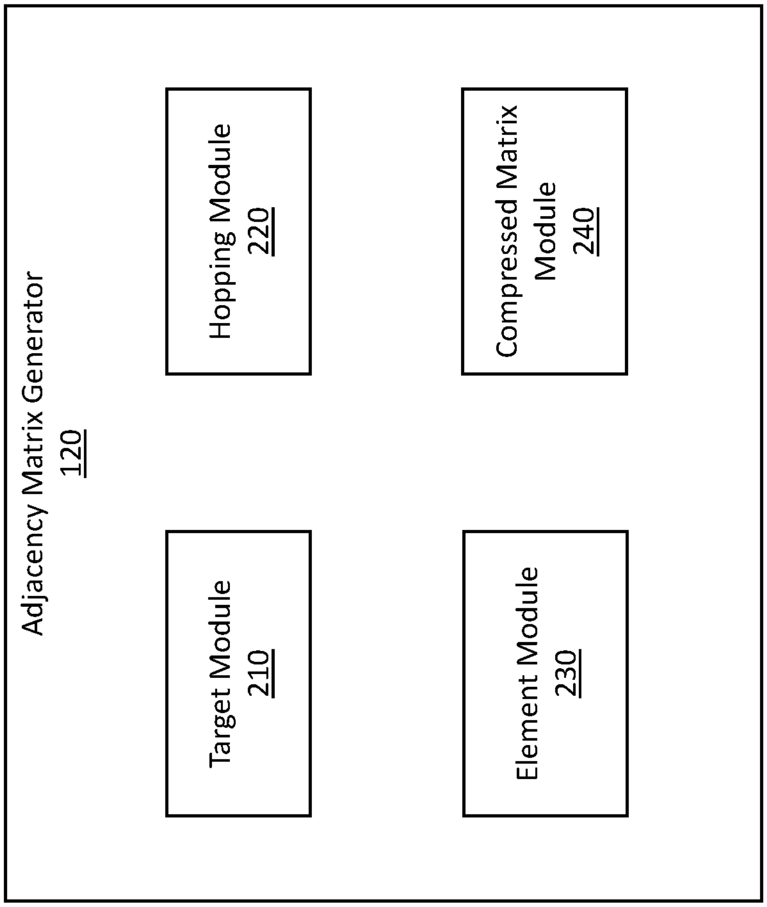
FIG. 2 is a block diagram of an adjacency matrix generator, in accordance with various embodiments.

FIG. 2 is a block diagram of the adjacency matrix generator 120, in accordance with various embodiments. As described above, the adjacency matrix generator 120 can provide hierarchical adjacency matrices to facilitate mini-batching or sampling of graphs for DNN training or inference. As shown in FIG. 2, the adjacency matrix generator 120 includes a target module 210, a hopping module 220, an element module 230, and a compressed matrix module 240. In other embodiments, alternative configurations, different or additional components may be included in the adjacency matrix generator 120. Further, functionality attributed to a component of the adjacency matrix generator 120 may be accomplished by a different component included in the adjacency matrix generator 120, a component included in the DNN system 100, or a different system.

The target module 210 identifies target nodes. In some embodiments, the target module 210 may receive a request for identifying target nodes from a graph. The target module 210 may receive information about mini-batching or sampling for the graph. In an embodiment, the information may indicate the number of mini-batches for the graph, and the target module 210 may partition the graph into subsets of nodes based on the number of mini-batches. Each node in a subset may be a target node. A subset may also be referred to as a target neighborhood. For example, the target module 210 may determine that the size of each subset (e.g., the number of nodes in the subset) is equal to the size of the graph (e.g., the number of nodes in the graph) divided by the number of mini-batches. The size of the subsets may be the same. In other examples, the subsets may have different sizes. The target module 210 may further select the nodes for each subset based on the size of the subset, their relative position and connectivity in the whole graph, randomly, or in another predetermined fashion. In some embodiments, the nodes in different subsets are different. The target module 210 may also interact with the hopping module 220 (described below) to select target nodes.

The hopping module 220 identifies nodes that are neighbors of target nodes identified by the target module 210. The hopping module 220 may identify neighbor nodes of a target node by using a hopping approach based on the edges associated with the target node in the graph. Each hop may include the identification of one or more nodes in a respective neighborhood. In some embodiments, the hopping module 220 may determine various neighborhoods that have different levels of connections with the target node. For instance, the hopping module 220 may first identify one or more nodes that are directly connected to the target node as the 1-hop neighbors. These nodes constitute the 1-hop neighborhood. Next, the hopping module 220 hops to the next level of connections and identifies one or more nodes that are directly connected to any of the 1-hop neighbors. These nodes constitute the 2-hop neighborhood. Then the hopping module 220 further identifies the 3-hop neighborhood based on every node in the 2-hop neighborhood.

The hopping module 220 may determine the number of neighborhoods or hops needed for a subgraph based on the DNN, e.g., the architecture of the DNN. In some embodiments, the hopping module 220 may determine that the number of hops (or the number of neighborhoods minus one) equals the number of layers in the DNN. In an example where the DNN includes 10 layers, the hopping module 220 may identify the neighbor nodes in 10 neighborhoods, from the 1-hop neighborhood to the 10-hop neighborhood. With the target neighborhood identified by the target module 210, there are 11 neighborhoods in total. A neighborhood is also referred to as a node group. The 11 neighborhoods may be in a hierarchical sequence, based on which a hierarchical adjacency matrix may be generated by the element module 230.

In some embodiments, the hopping module 220 may select a subset of the nodes identified in a particular hop (e.g., i-hop, where i is an integer), as opposed to all the identified nodes, as the i-hop neighbors of the target node. For instance, the hopping module 220 may determine a threshold number of nodes for the i-hop. The hopping module 220 may also determine whether the total number of nodes identified in the hop is greater than the threshold. In embodiments where the total number of identified nodes is no greater than the threshold, the hopping module 220 may include all the identified nodes as the i-hop neighbors of the target node. In embodiments where the total number of identified nodes is greater than the threshold, the hopping module 220 may sample a subset of the identified nodes. In some embodiments, the hopping module 220 may determine the threshold number based on computational resources available for the training or inference of the DNN, such as computing power of the processing unit, memory storage, and so on.

In some embodiments, the sampling may be based on a sampling rate. The hopping module 220 may determine the sampling rate based on the total number of identified nodes and the threshold number. For instance, the sampling rate may equal the total number of identified nodes divided by the threshold number. The hopping module 220 may then sample the identified nodes based on the sampling rate. In an example where the total number of identified nodes is M and the same rate is 1/R, the hopping module 220 may select one node from every R nodes and obtain M/R nodes as the i-hop neighbors of the target node. The sampling may prevent the hopping module 220 from identifying too many neighbor nodes, which may cause the size of the subgraph to be too large. Multiple methods can be used for selecting this subset such as random selection or selection based on node connectivity characteristics.

In some embodiments, the hopping module 220 may generate a data structure (e.g., a vector, matrix, or a tensor of a higher dimension) that tracks the number of nodes or the number of edges in each hop. Each respective element in the data structure may correspond to a different hop. The value of an element may equal the number of nodes or the number of edges that have been added to the subgraph at the corresponding hop. For example, the first element in the data structure may correspond to the 0-hop and have a value equal to the number of target nodes in the subgraph. The second element may correspond to the 1-hop and have a value equal to the total number of target nodes and 1-hop neighbors. In an example where the last hop is N-hop, the N-th element in the data structure may correspond to the N-hop and have a value equal to the total number of nodes in the subgraph.

The element module 230 determines elements of hierarchical adjacency matrices based on nodes identified by the target module 210 and the hopping module 220. The element module 230 may determine the node represented by each respective row and column of a hierarchical adjacency matrix. The number of rows or columns of the hierarchical adjacency matrix may equal the total number of nodes identified by the target module 210 and the hopping module 220.

In some embodiments, the element module 230 may generate a target matrix for the target nodes identified by the target module 210. Each target node is associated with a row and a column in the target matrix. The index of the row and the index of the column of a single target node may match. For instance, a target node is associated with the first row and the first column in the target matrix, and another target node is associated with the second row and the second column in the target matrix. An element may have (x,y) coordinates that indicate the row and column where the element is located, respectively. Each element in the target matrix may have a value of one or zero, which encodes an edge between the target node in the row and the target node in the column. In an example where there are two target nodes that are not connected to each other, the element (0, 0) (i.e., the element in the first row and the first column) or the element (1, 1) (i.e., the element in the second row and the second column) has a value of one as the element corresponds to the same target node, versus the element (0, 1) or (1,0) has a value of zero as the element correspond to the two target nodes that are not connected. In embodiments where there are more target nodes, the size of the target matrix is larger. In embodiments where there is one target node, the target matrix includes one element.

After the target matrix is generated, the element module 230 may add more rows and columns to the target matrix based on the neighbor nodes of the target nodes. The element module 230 may start with the 1-hop neighbors of the target nodes. Each 1-hop neighbor is associated with a respective row and column. After the element module 230 finishes all the 1-hop neighbors, the element module 230 may further add more rows and columns for the 2-hop neighbors. This may continue till the element module 230 finishes all the neighbor nodes.

Figure 5:
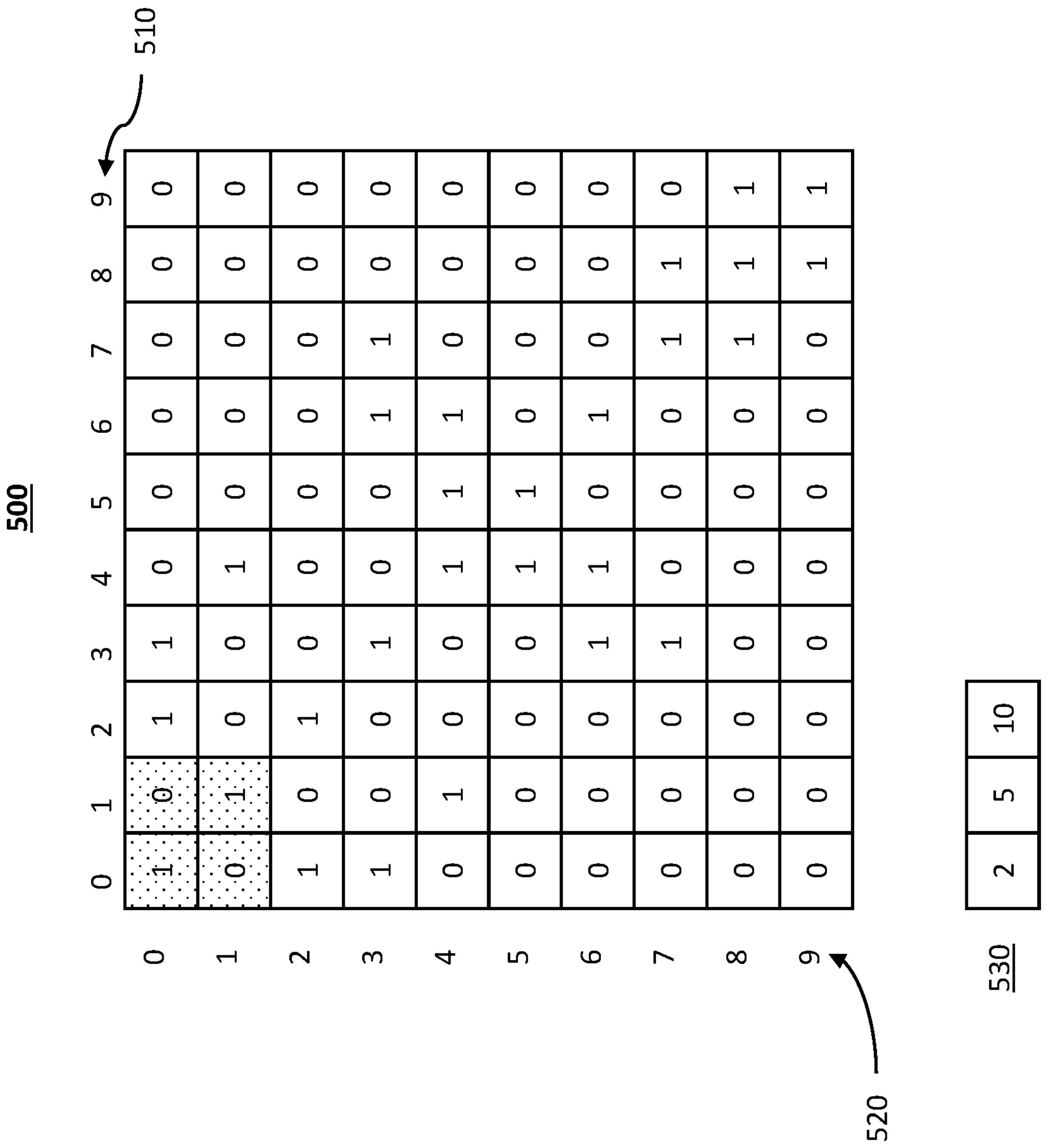
FIG. 5 illustrates an example hierarchical adjacency matrix, in accordance with various embodiments.

The element module 230 generates the hierarchical adjacency matrix for the subgraph after all the neighbor nodes are finished. The element module 230 may determine the value of each respective element in the hierarchical adjacency matrix based on the node(s) associated with the row and the column where the respective element is located. The value of each respective element in the hierarchical adjacency matrix may indicate whether the corresponding node (s) are connected. In some embodiments, an element has a value of one when the nodes associated with the element's row and element are directly connected, versus a value of zero when the nodes associated with the element's row and element are not directly connected. In some embodiments, an element whose row and column are associated with the same node may have a value of one. In other embodiments, an element whose row and column are associated with the same node may have a value of zero. The hierarchical adjacency matrix reflects the connections of the nodes in the graph, as the neighbor nodes that are directly connected to the target nodes are closer to the target nodes than the other neighbor node, and the neighbor nodes in further hops are further from the target nodes. An example hierarchical adjacency matrix is shown in FIG. 5.

In some embodiments, the element module 230 may determine values of the elements in a hierarchical adjacency matrix based on an adjacency matrix of the corresponding graph. The elements in the adjacency matrix of the graph may encode the edges in the graph. The element module 230 may extract data from the adjacency matrix and load the data into the hierarchical adjacency matrix.

An adjacency matrix may be a sparse matrix, e.g., most of the elements in the adjacency matrix are zeros, or the number of zero-valued elements is more than the number of rows or columns of the adjacency matrix. In some embodiments, the adjacency matrix may be stored in a sparse format so that the non-zero valued elements of the adjacency matrix are stored but most or even all the zero-valued elements of the adjacency matrix are not stored. In other embodiments, the adjacency matrix may be compressed and stored in a compressed format (which may be a sparse compressed format) so that a subset of the elements in the adjacency matrix are stored. The element(s) not stored in the memory may include one or more zero valued elements or one or more non-zero valued elements. There may be metadata associated with the compressed format that indicates the values and positions of the elements not stored in the memory. Compared with storing the adjacency matrix in a sparse format or storing the adjacency matrix in a sparse uncompressed format (i.e., all the elements in the adjacency matrix are stored), storing the adjacency matrix in a compressed format can save memory footprint and bandwidth.

The compressed matrix module 240 processes compressed adjacency matrices, such as matrices in CSR or COO format. In some embodiments, the compressed matrix module 240 may determine the format of a compressed adjacency matrix and extract data from the compressed adjacency matrix based on the format. Examples of the format include coordinate List (COO), compressed spare row (CSR), and so on. After the compressed matrix module 240 extracts the data, the compressed matrix module 240 may provide the data to the element module 230 for generating a hierarchical adjacency matrix. More details regarding compressed adjacency matrix are provided below in conjunction with FIGS. 6A, 6B, and 7A-7D.

Example Process of Generating Hierarchical Adjacency Matrix

Figure 3:
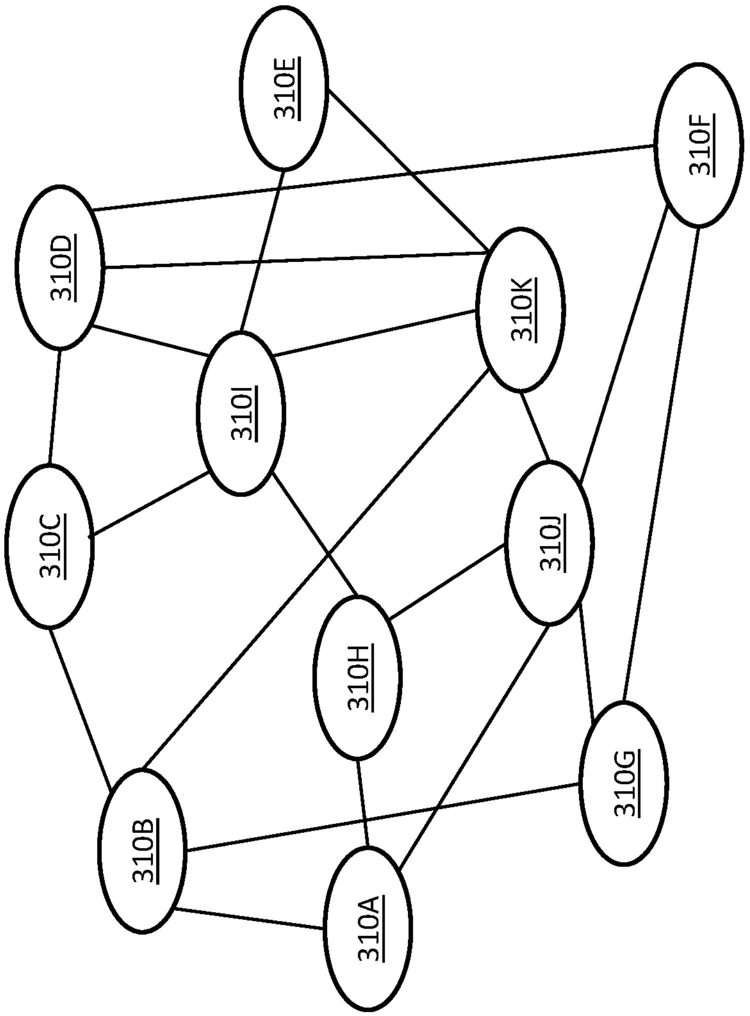
FIG. 3 illustrates an example graph, in accordance with various embodiments.

FIG. 3 illustrates an example graph 300, in accordance with various embodiments. The graph 300 is a data structure including a collection of nodes 310A-310K (collectively referred to as "nodes 310" or "node 310"). The lines linking the nodes 310 indicate connections between the nodes 310. A connection in the graph 300 is referred to as an edge. The nodes 310 and edges in FIG. 3 are shown for the purpose of illustration. In other embodiments, the graph 300 may include a different number of nodes or different edges.

The graph 300 may be used to represent various types of data, such as text, image, data about a social network, and so on. In an example where the graph 300 represents an image, a node 310 may represent a feature in the image. The edges may indicate relationships between the features in the image. A node 310 may be associated with an embedding that encodes information about the feature, such as color, shape, size, classification, and so on. In another example, the graph 300 may represent a social network. A node 310 may represent a person using the social network. The edges may indicate affinity among the people in the social network. In other examples, the graph 300 may represent other data. The graph 300 may be associated with an adjacency matrix that encodes the edges in the graph. The graph 300 may be processed by a DNN, e.g., a GNN, for making a determination about the data represented by the graph 300. For instance, the DNN may process text, classify an image, or understand a social network represented by the graph 300. The DNN may output embeddings associated with the graph. The output embeddings may solve a problem for which the DNN is trained.

Figure 4:
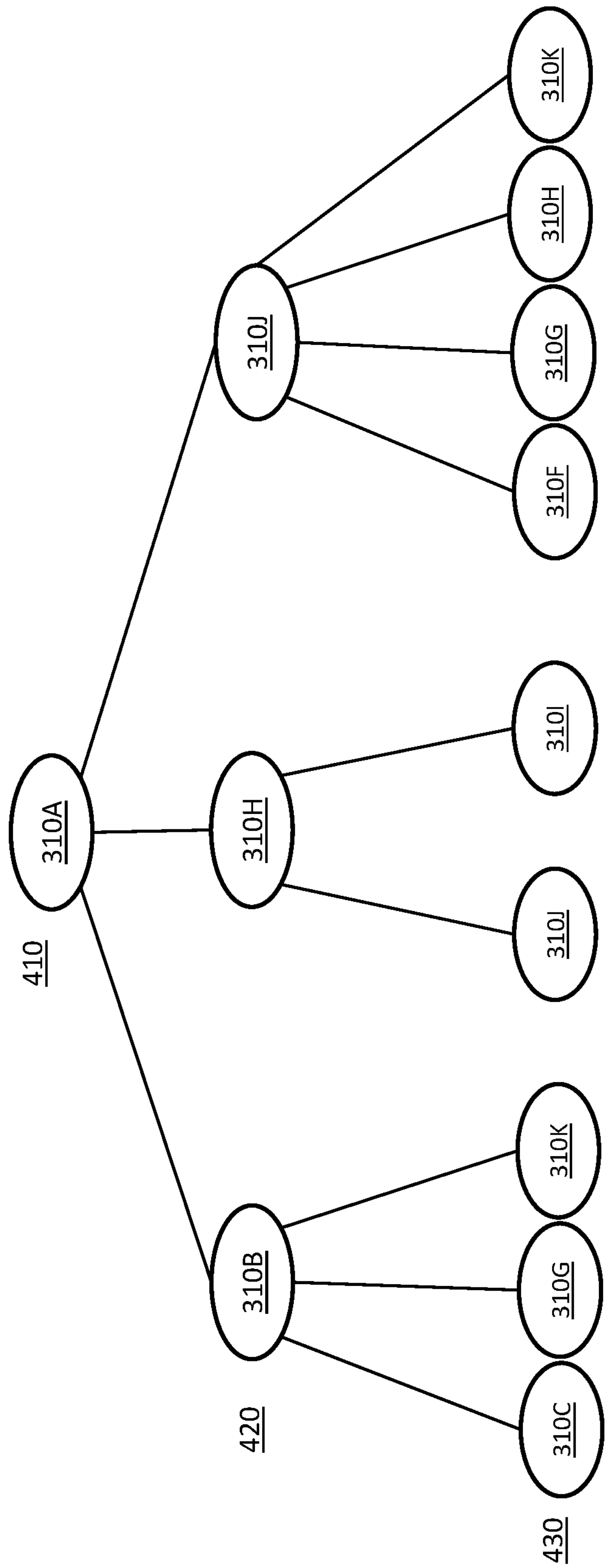
FIG. 4 illustrates neighbors of a node in the graph, in accordance with various embodiments.

FIG. 4 illustrates neighbors of a node 310A in the graph 300, in accordance with various embodiments. For the purpose of illustration, the node 310A may be identified, e.g., by the target module 210 in FIG. 2, as a target node, the embedding of which is to be updated by a DNN. The neighbors may be identified by the hopping module 220 in FIG. 2.

The node 310A constitutes a target neighborhood 410. In other embodiments where one or more other target nodes are identified, the target neighborhood 410 may include one or more other nodes. As shown in FIG. 4, the node 310 has three 1-hop neighbors, which constitute a 1-hop neighborhood 420 including the nodes 310B, 310H, and 310J. The nodes 310B, 310H, and 310J are directly connected to the node 310A in the graph 300.

The node 310 has 12 2-hop neighbors, which constitute a 2-hop neighborhood 430. Each 2-hop neighbor is directly connected to a 1-hop neighbor, i.e., the node 3106, 310H, or 310J. The nodes 310C, 310G, and 310K are directly connected to the node 310B in the graph 300. The nodes 310J and 3101 are directly connected to the node 310H in the graph 300. The nodes 310F, 310G, 310H, and 310K are directly connected to the node 310J in the graph 300. Even though not shown in FIG. 4, additional neighbors of the node 310A may be identified in some embodiments.

FIG. 5 illustrates an example hierarchical adjacency matrix 500, in accordance with various embodiments. FIG. 5 also shows a row index vector 510 and a column index vector 520. Each value in the row index vector 510 indicates the index of a respective row in the hierarchical adjacency matrix 500. Each value in the column index vector 520 indicates the index of a respective column in the hierarchical adjacency matrix 500. The hierarchical adjacency matrix 500 includes 10 rows and 10 columns, which represent 10 nodes in a graph. For the purpose of illustration, Row0/Column0 represents a target node. Row1/Column1 represents another target node. The elements encoding the edges between the target nodes are shaded in FIG. 5. Row2-4 and Column2-4 represent three 1-hop neighbors of the target nodes. Row5-9 and Column5-9 represent four 2-hop neighbors of the target nodes. Each element in the hierarchical adjacency matrix 500 indicates whether the node represented by the row where the element is located is connected to the node represented by the column where the element is located. In the embodiments of FIG. 5, a zero-valued element indicates that the nodes are not connected, versus a one-valued element indicates that the nodes are connected or that the nodes are the same node.

The hierarchical adjacency matrix 500 is associated with a vector 530 that includes three elements. The value of each respective element indicates the number of nodes that were added to the subgraph at each hop. For instance, the first element corresponds to the 0-hop and has a value of 2, indicating that there are two target nodes. The second element corresponds to the 1-hop and has a value of 5, indicating that five nodes have been added to the subgraph at the 1-hop. The third element corresponds to the 2-hop and has a value of 10 indicating that ten nodes have been added to the subgraph at the 2-hop. In embodiments where there are additional hops, the vector 530 may include additional elements.

The hierarchical adjacency matrix 500 may be input into a DNN as a training sample or as input data of an inference process. In some embodiments, the hierarchical adjacency matrix 500 may be input into the second last layer of a DNN, and the 16 elements in Row0-4 and Column0-4 may be input into the last layer of the DNN. An output of the DNN may include update in one or more embeddings of the target nodes.

Figure 6A:
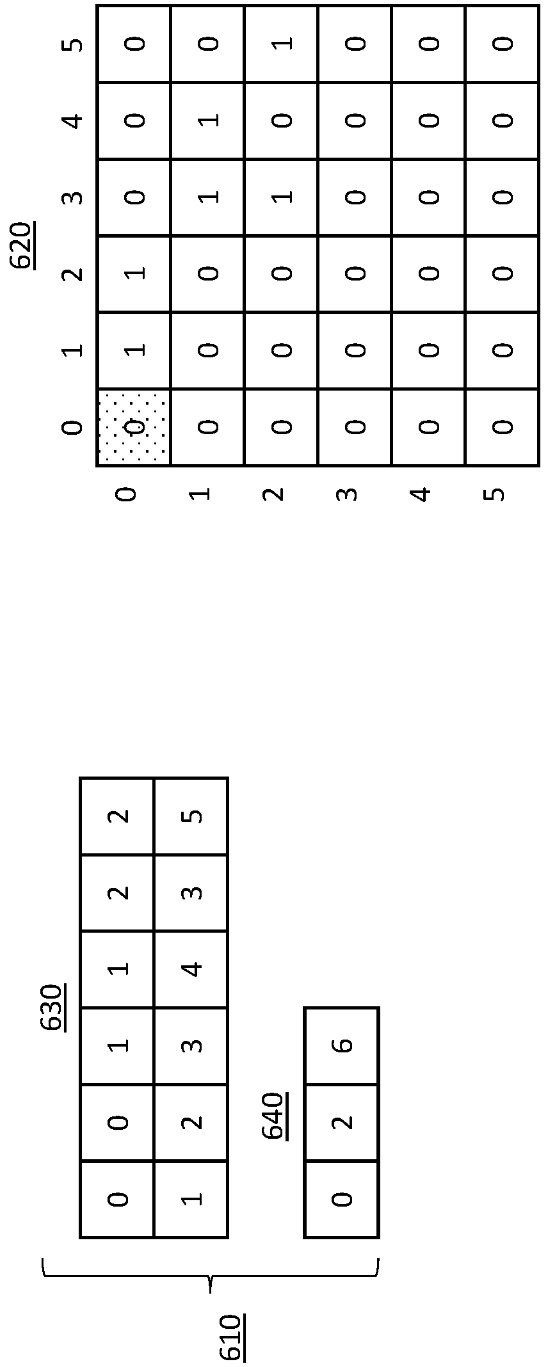
FIGS. 6A and 6B illustrate processing a compressed adjacency matrix, in accordance with various embodiments.
Figure 6B:
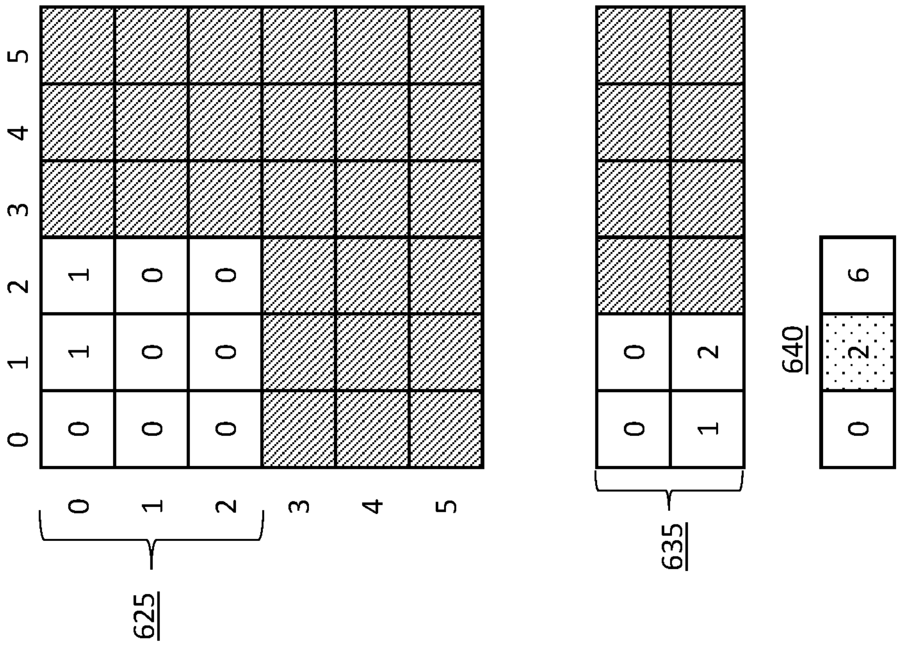

FIGS. 6A and 6B illustrate processing a compressed adjacency matrix 610, in accordance with various embodiments. The compressed adjacency matrix 610 may be processed by the compressed matrix module 240 in FIG. 2. The compressed adjacency matrix 610, which is shown in FIG. 6A, is generated by compressing a sparse adjacency matrix 620, which is also shown in FIG. 6A, with a COO format. For the purpose of illustration and simplicity, the sparse adjacency matrix 620 is a tensor encoding edges in two neighborhoods of a target node. The target node is represented by the first row and the first column of the sparse adjacency matrix 620. The corresponding element in the sparse adjacency matrix 620 is shaded in FIG. 6. The 1-hop neighborhood of the target node includes a node represented by the second row and the second column and another node represented by the third row and the third column. The 2-hop neighborhood of the target node includes a node represented by the fourth row and the fourth column, another node represented by the fifth row and the fifth column, and yet another node represented by the sixth row and the sixth column. In other embodiments, there may be a different number of nodes or a different number of edges for the sparse adjacency matrix 620.

The compressed adjacency matrix 610 includes an edge list matrix 630 and an edge number vector 640. The edge list matrix 630 provides the positions of the non-zero elements in the sparse adjacency matrix 620. Each column in the edge list matrix 630 is for a respective non-zero element in the sparse adjacency matrix 620. For instance, the first column of the edge list matrix 630 indicates that the position index of the first non-zero element in the sparse adjacency matrix 620 is (0, 1), meaning the first non-zero element is in Row0 and Column1 of the sparse adjacency matrix 620. There are six non-zero elements in the sparse adjacency matrix 620, so there are six columns in the edge list matrix 630. The edge number vector 640 shows the number of edges (i.e., the number of non-zero elements) associated with each neighborhood. The first element in the edge number vector 640 indicates that there is no non-zero element associated with the target node, the second element in the edge number vector 640 indicates that there are two non-zero elements associated with the 1-hop neighborhood, and the third element in the edge number vector 640 indicates that there are six non-zero elements associated with the 2-hop neighborhood.

The compressed matrix module 240 can extract data from the compressed adjacency matrix 610 based on the COO format. The COO format may allow the compressed matrix module 240 to exact data by changing the view on underlaying memory. Position information of the edges that would be needed for generating the hierarchical adjacency matrix may be located at the beginning of the edge list matrix 630, as the adjacency matrix may be generated using the breadth-first search approach. The breadth-first search approach can sort nodes based on their distances from the target node and sort edges in a way where edges connecting the target node to 1-hop neighbors are before edges connecting 1-hop neighbors to 2-hop neighbors, and so on.

For the purpose of illustration, FIG. 6B illustrates the compressed matrix module 240 extracts data for generating a hierarchical adjacency matrix for up to the 1-hop neighborhood of the target node. The generation of the hierarchical adjacency matrix requires edges for the target node and the 1-hop neighbor nodes. The compressed matrix module 240 extracts the required edges based on the second element in the edge number vector 640. As the value of the second element in the edge number vector 640 is two, the compressed matrix module 240 extracts the first two columns of the edge list matrix 630, i.e., the submatrix 635 in FIG. 6B. The compressed matrix module 240 processes the submatrix 635 to generate a matrix 625, which is a submatrix of the sparse adjacency matrix 620. The submatrix 640 may be used to track the number of nodes or the number of edges in each hop. The submatrix 635 may represent the matrix 625 in the compressed format. The matrix 625 (or its compression representation, e.g., the submatrix 635) can be used as a hierarchical adjacency matrix to update the target node.

Figure 7A:
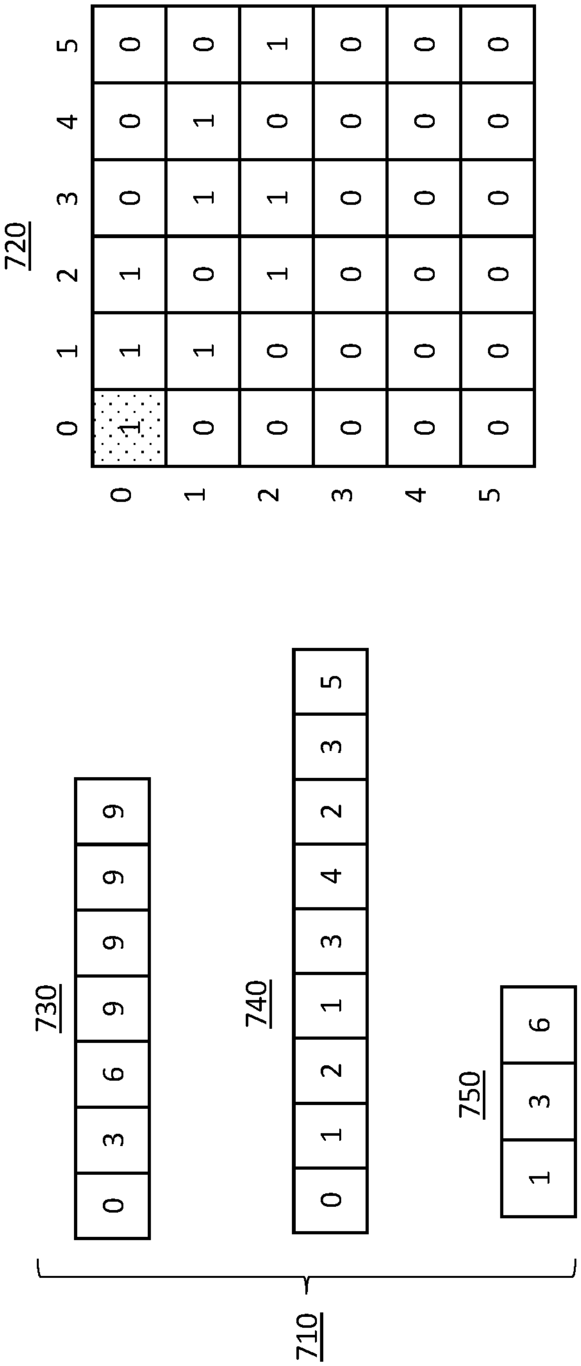
FIGS. 7A-7D illustrate processing another compressed adjacency matrix, in accordance with various embodiments.

FIGS. 7A-7D illustrate processing another compressed adjacency matrix 710, in accordance with various embodiments. The compressed adjacency matrix 710 is generated by compressing a sparse adjacency matrix 720, which is also shown in FIG. 7A. For the purpose of illustration and simplicity, the sparse adjacency matrix 720 is a tensor encoding edges in two neighborhoods of a target node. The target node is represented by the first row and the first column of the sparse adjacency matrix 720. The corresponding element in the sparse adjacency matrix 720 is shaded in FIG. 7. The 1-hop neighborhood of the target node includes a node represented by the second row and the second column and another node represented by the third row and the third column. The 2-hop neighborhood of the target node includes a node represented by the fourth row and the fourth column, another node represented by the fifth row and the fifth column, and yet another node represented by the sixth row and the sixth column. In other embodiments, there may be a different number of nodes or a different number of edges for the sparse adjacency matrix 720.

The compressed adjacency matrix 710 is in a CSR format, with which data can be stored as compressed rows. Given the sparsity in the sparse adjacency matrix 720, some columns from every row need to be removed. Also, some numbers of rows from the end need to be removed. As shown in FIG. 7A, the compressed adjacency matrix 710 includes three vectors: a row index vector 730, a column index vector 740, and a value vector 750. The row index vector 730 stores the information about the number of nonzero elements in each row. The row index vector 730 has a length equal to the number of nodes (i.e., the number of rows of the sparse adjacency matrix 720) plus one. The column index vector 740 contains the columns indexes for non-zero elements row-wise. The value vector 750 includes values assigned to the edges between nodes. For graphs which do not use edge features, these values may be set to 1.

Figure 7B:
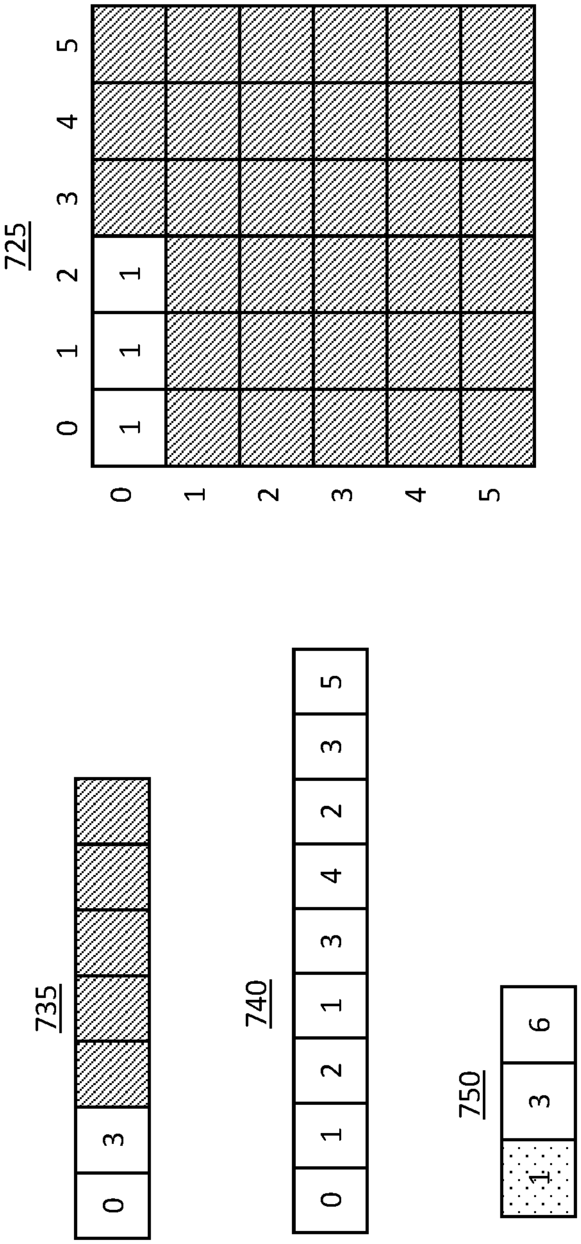

The compressed adjacency matrix 710 may be processed by the compressed matrix module 240 in FIG. 2. The compressed matrix module 240 may identify the neighborhood(s) needed fora DNN layer. For example, for the k-th layer of the DNN, the compressed matrix module 240 identifies the edges for all the k-hop neighborhood nodes, which include edges from (k+1)-hop neighbors to the k-hop neighbors. The compressed adjacency matrix 710 may extract the k+1 subgraph by trimming the row index vector 730. In the embodiments of FIGS. 7A-7D, k is equal to zero, i.e., the hierarchy adjacency matrix is to be generated for updating the target neighborhood (aka 0-hop neighborhood). As shown in FIG. 7B, the compressed matrix module 240 can trim the row index vector 730 based on the first element of the value vector 750, the value of which is 1.

The value vector 750 may be used to track the number of nodes or the number of edges in each hop. The first element of the value vector 750 indicates the number nodes in the target neighborhood. In the embodiments of FIGS. 7A-7D, the target collection of nodes includes one node. Accordingly, the compressed matrix module 240 keeps the first two elements of the row index vector 730 and removes the other elements of the row index vector 730. The compressed matrix module 240 generates a new row index vector 735, which corresponds to a submatrix 725 of the full adjacency matrix 720.

Figure 7C:
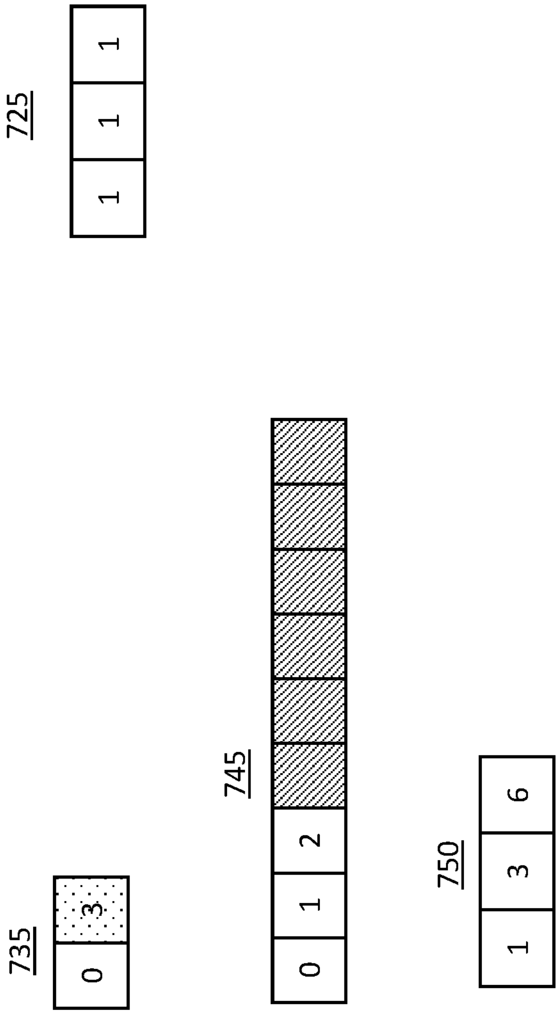

After the row index vector 730 is trimmed, the compressed matrix module 240 may trim the column index vector 740. As shown in FIG. 7C, the compressed matrix module 240 trims the column index vector 740 based on the last element of the row index vector 735, which is highlighted with shade in FIG. 7C. The compressed matrix module 240 keeps the first three elements of the column index vector 740 and removes the other elements of the column index vector 740. The compressed matrix module 240 generates a new column index vector 745.

Figure 7D:
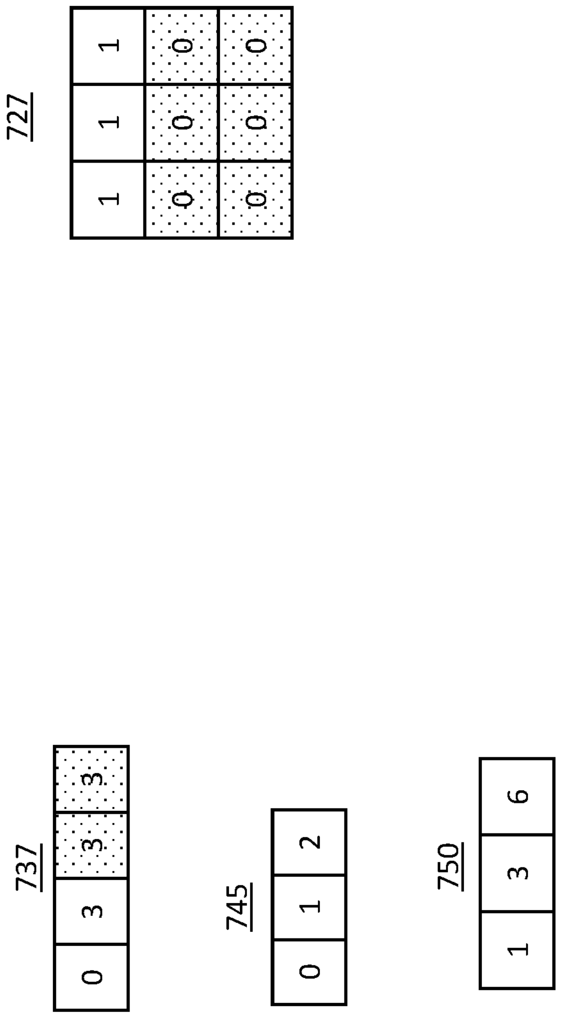

After the column index vector 740, the compressed matrix module 240 may restore the empty rows for the (k+1)-hop neighborhood by repeating the last element of the row index vector 735 for all of them, effectively creating what would be rows of zeros in an equivalent uncompressed adjacency matrix. As shown in FIG. 7D, two new elements are added to the row index vector 735 to form a new row index vector 737, and the two new elements have the same value as the last element of the row index vector 735. The two new elements are highlighted with shade in FIG. 7D. Also, two new rows are added to the submatrix 725 to generate a new matrix 727. The row index vector 737 and the column index vector 745 may represent the matrix 727 in the compressed format. All the elements in the two new rows are zeros. The matrix 727 (or its compressed representation, which includes the row index vector 737 and the column index vector 745) can be used as a hierarchical adjacency matrix to update the target node.

Example DNN Training Process

Figure 8:
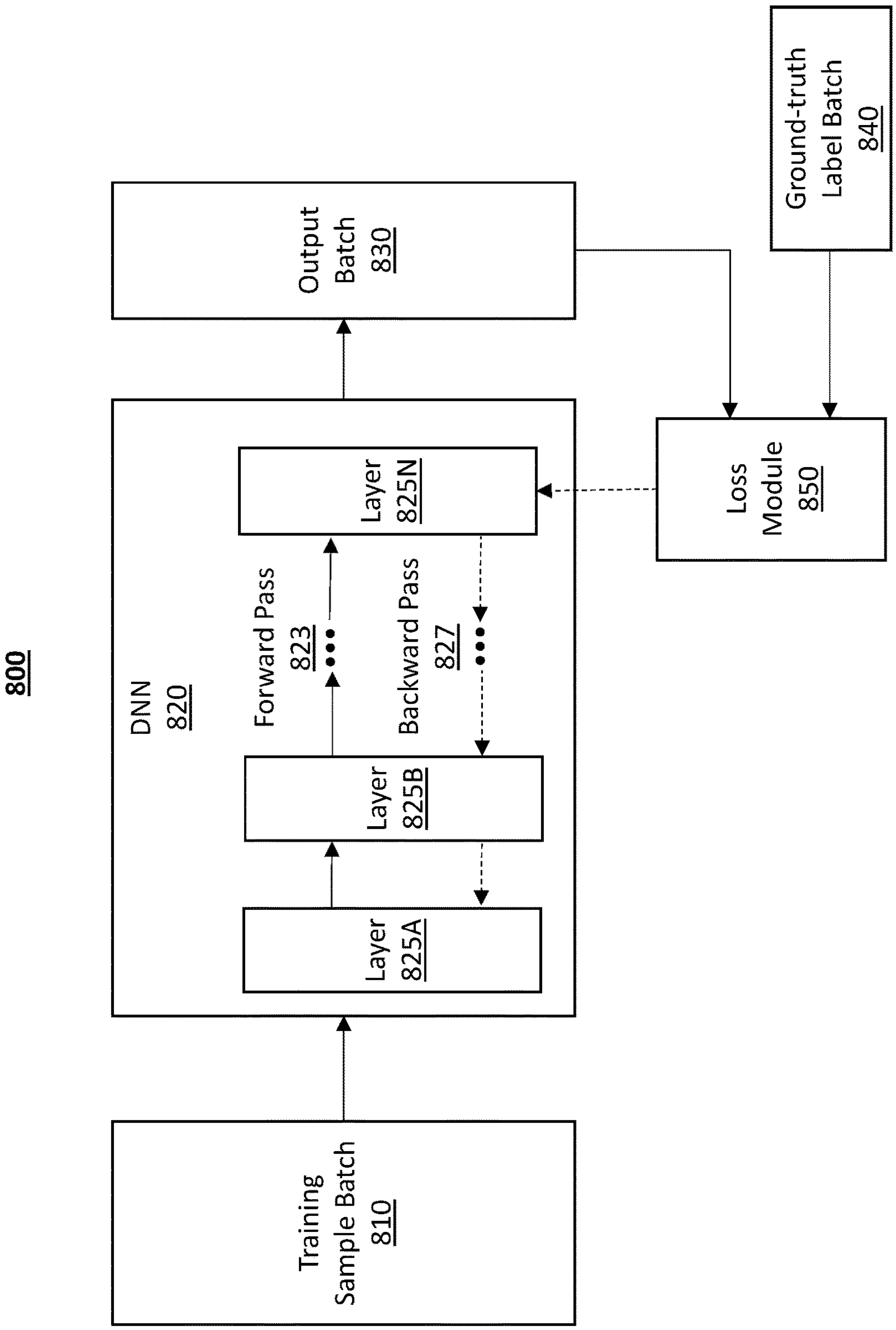
FIG. 8 illustrates an example process of training a DNN with mini-batching, in accordance with various embodiments.

FIG. 8 illustrates an example process 800 of training a DNN with mini-batching, in accordance with various embodiments. The process 800 may be performed at least partially by the training module 130 in FIG. 1. The DNN 820 includes a plurality of layers 825A-525N (collectively referred to as "layers 825" or "layer 825"). In the embodiments of FIG. 8, the process 800 includes one or more training cycles. Each training cycle may include three stages: forward propagation, backpropagation, and update. In other embodiments, a training cycle may include more, fewer, or different stages.

In the forward propagation stage of a training cycle, a batch of training samples (i.e., training sample batch 810) is input into the DNN 820. The training sample batch 810 includes some or all of the training samples in a training dataset for training the DNN 820. A training sample may be a hierarchical adjacency matrix along with a dense matrix with node and (optionally) edge features. The hierarchical adjacency matrix may include (N+1) rows and (N+1) columns. Each row or column may correspond to a different neighborhood of one or more nodes in a data structure, e.g., a graph. The neighborhood may be arranged in a sequence. For instance, the hierarchical adjacency matrix may start with a 0-hop neighborhood including all the target nodes (one or more), followed by one or more 1-hop neighbors of the target node(s), further followed by one or more nodes in the 2-hop neighborhood of the target node(s), till one or more N-hop neighbors of the target node(s).

A training sample may pass through the layers 825 sequentially, e.g., along the forward pass 823. In some embodiments, the layer 825A may receive the entire hierarchical adjacency matrix. The layer 825B may receive the hierarchical adjacency matrix excluding the elements for the one or more nodes in the N-hop neighborhood. The layer 825B may receive the hierarchical adjacency matrix excluding the elements for the one or more nodes in the N-hop neighborhood and excluding the elements for the one or more nodes in the (N−1)-hop neighborhood. Every layer may receive less elements in the hierarchical adjacency matrix than the preceding layer(s). The last layer 825N may receive elements in the hierarchical adjacency matrix that correspond to the target node and the 1-hop neighbors. In each layer 825, one or more deep learning operations may be performed the internal parameters (e.g., weights) of the layer 825. In some embodiments, one or more layers 825 in the DNN may be skipped during a training or inference process. For instance, the layer 825B may be skipped, and the layer 825C may receive and process output from the layer 825A.

The output from the last layer 825N may be the output of the DNN 820. In some embodiments, the output from the last layer 825N may include update in one or more embeddings associated with the target node(s). By processing the training sample batch 810, the DNN 820 provides an output batch 830. The output batch 830 may include a plurality of outputs, each of which is generated based on a respective training sample in the training sample batch 810.

In the backpropagation stage, gradients with respect to one or more internal parameters of the DNN 820 are computed. In some embodiments, a gradient tensor including a plurality of gradients with respect to weight is computed based on a backpropagation algorithm. The gradient tensor may have the same spatial size as the corresponding weight tensor (e.g., a kernel). A gradient may be denoted by:

$$\frac{\partial C}{\partial w} = a_{in}\delta_{out}$$

where $$\frac{\partial C}{\partial w}$$

is the gradient, $a_{in}$ denotes the activation of the neural input to the weight w, and $\delta_{out}$ denotes the error of the neuron output from the weight w.

In some embodiments, the loss module 850 may compute the gradients of a loss function with respect to the weights of the DNN 820 for a single output of the DNN 820. For instance, the loss module 850 may receive the output batch 830 and a ground-truth label batch 840. The ground-truth label batch 840 includes ground-truth labels of the training samples in the training sample batch 810. A training sample may have one or more ground-truth labels. The loss module 850 can determine differences between the outputs and ground-truth labels. For instance, the loss module 850 may determine a different between each output and the corresponding ground-truth label. The loss module 850 may determine a loss by aggregating the differences. The loss module 850 may further determine the gradients based on the loss. In some embodiments, gradients for some or all of the layers 825 are computed sequentially in a backward matter in the backpropagation stage, e.g., along the backward pass 827. For instance, the gradients for a layer (e.g., the layer 825B) is computed before the gradients for a preceding layer (e.g., the layer 825A).

In the update stage, the internal parameters of the DNN 820, such as weights, are updated based on the gradients to reduce or minimize the loss. In some embodiments, the weights are updated once for one training sample batch, such as the training sample batch 810. As there can be multiple training sample batches, the weights can be updated multiple times based on one training dataset. The entire training dataset may be passed through the DNN 820 multiple times, e.g., each batch or training sample may be fed into the DNN 820 multiple times, i.e., multiple epochs.

In some embodiments, the DNN 820 may include one or more additional layers, which may be arranged before or after the layer 825N. For instance, a layer after the layer 825N may receive the output of the layer 825N for a downstream task. The downstream task may be content generation, recommendation, image classification, and so on. The one or more additional layers may include convolutional layer, pooling layer, fully-connected layer, attention layer, other types of neural network layers, or some combination thereof. In some embodiments, the training of the layers 825 may be separated from the training of the additional layer(s). In other embodiments, the training of the layers 825 and the training of the additional layer(s) may be integrated.

Example Method of DNN Training and Inference

Figure 9:
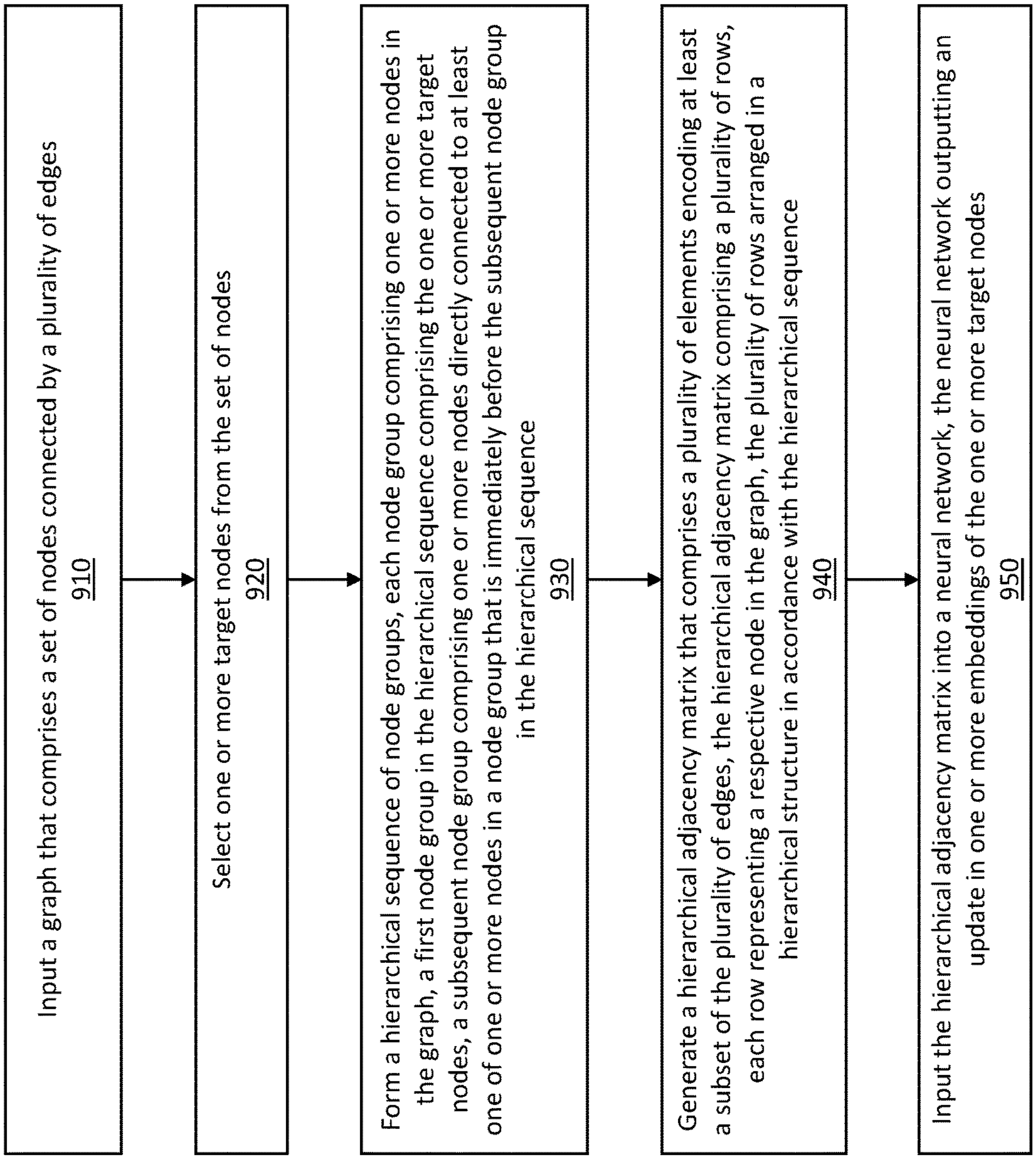
FIG. 9 is a flowchart showing a method of DNN training or inference with a hierarchical adjacency matrix, in accordance with various embodiments.

FIG. 9 is a flowchart showing a method 900 of DNN training or inference with a hierarchical adjacency matrix, in accordance with various embodiments. The method 900 may be performed by the DNN system 100 in FIG. 1. Although the method 900 is described with reference to the flowchart illustrated in FIG. 9, many other methods for DNN training or inference with a hierarchical adjacency matrix may alternatively be used. For example, the order of execution of the steps in FIG. 9 may be changed. As another example, some of the steps may be changed, eliminated, or combined.

The DNN system 100 obtains 910 a graph that comprises a collection of nodes connected by a plurality of edges. In some embodiments, a node represents an object, such as a person, vehicle, tree, building, animal, and so on. Different nodes may represent objects of the same time or objects of different types. In some embodiments, a node is associated with an embedding or embedding vector that encodes one or more characteristics of the object. The embedding vectors of the nodes may be in the same embedding space, where the distance between two embedding vectors may indicate a relationship between the two nodes.

The DNN system 100 selects 920 one or more target nodes from the collection of nodes. In some embodiments, a target node is a node whose embedding vector is going to be updated by the neural network.

The DNN system 100 forms 930 a hierarchical sequence of node groups. Each node group comprises one or more nodes in the graph. A first node group in the hierarchical sequence comprises the one or more target nodes. A subsequent node group comprises one or more nodes directly connected to at least one of one or more nodes in a node group that is immediately before the subsequent node group in the hierarchical sequence.

In some embodiments, the DNN system 100 forms a second node group comprising one or more second nodes, each of which is directly connected to at least one of the one or more target nodes in the graph. The DNN system 100 also forms a third node group comprising one or more third nodes, each of which is directly connected to at least one of the one or more second nodes in the graph. In some embodiments, the DNN system 100 determines a layer count of the neural network, the layer count indicating how many layers are present in the neural network. The DNN system 100 forms the hierarchical sequence of node groups based on the layer count. In some embodiments, the number of node groups in the hierarchical adjacency matrix is equal to the layer count.

The DNN system 100 generates 940 a hierarchical adjacency matrix that comprises a plurality of elements encoding at least a subset of the plurality of edges. The hierarchical adjacency matrix comprises a plurality of rows. Each row represents a respective node in the graph. The plurality of rows is arranged in the hierarchical adjacency matrix in accordance with the hierarchical sequence. In some embodiments, the DNN system 100 retrieves, from a memory, an adjacency matrix in a compressed format. The adjacency matrix in the compressed format comprises one or more values that represent the plurality of edges in the graph. The compressed format may be COO, CSR, or other compressed formats. The DNN system 100 determines values of the plurality of elements in the hierarchical adjacency matrix based on the adjacency matrix in a compressed format.

The DNN system 100 inputs 950 the hierarchical adjacency matrix into a neural network. The neural network outputs an update in one or more embeddings of the one or more target nodes. An embedding encodes a characteristic of a target node. In some embodiments, the DNN system 100 inputs different portions of the hierarchical adjacency matrix into different layers of the neural network. In some embodiments, the neural network comprises a sequence of layers that includes a first layer and a second layer arranged after the first layer. The DNN system 100 inputs the plurality of elements of the hierarchical adjacency matrix into the first layer and inputs a subset of the plurality of elements into the last layer, the subset of the plurality of elements encoding one or more edges between the one or more target nodes.

Example Computing Device

Figure 10:
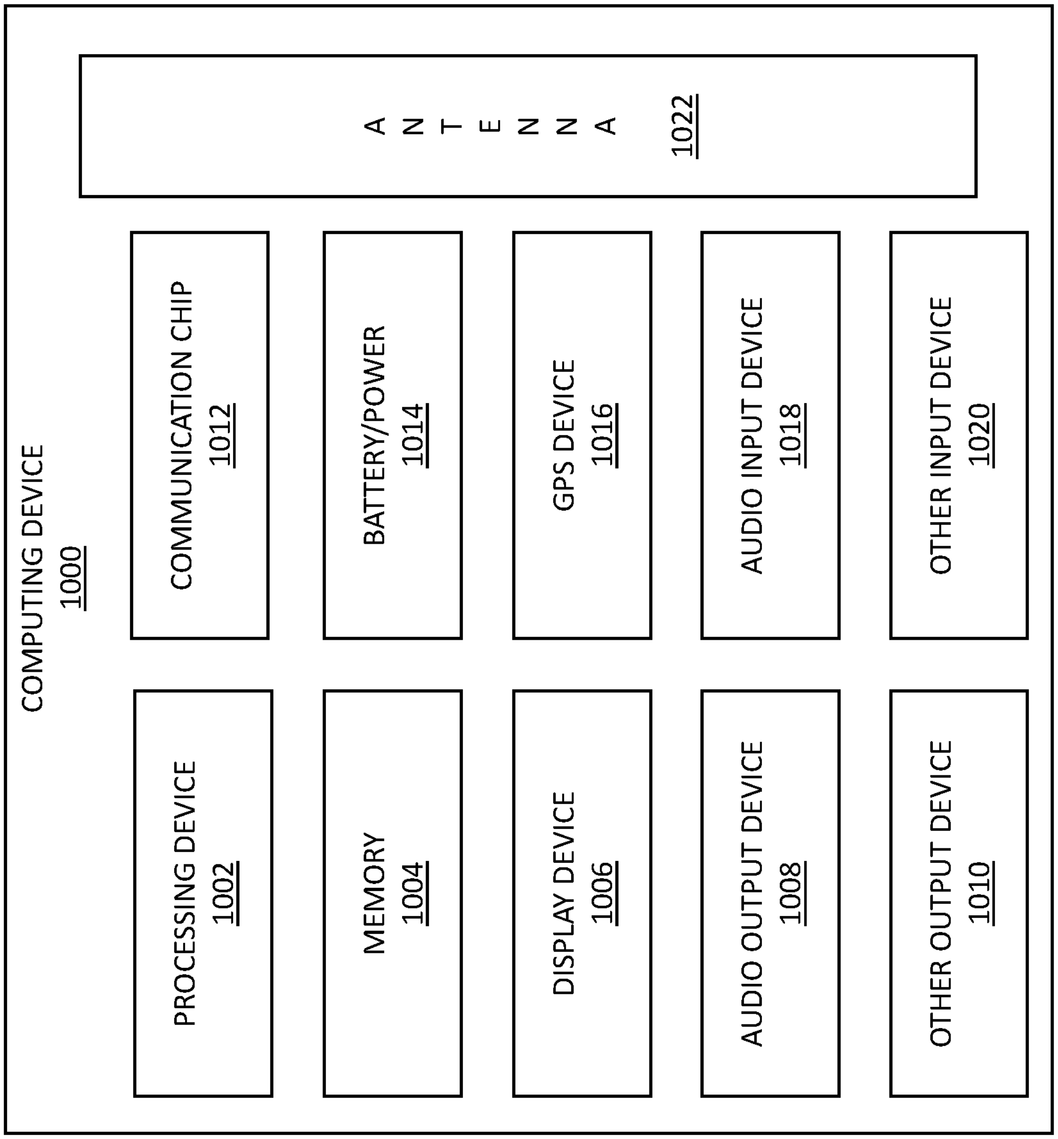
FIG. 10 is a block diagram of an example computing device, in accordance with various embodiments.

FIG. 10 is a block diagram of an example computing device 1000, in accordance with various embodiments. In some embodiments, the computing device 1000 may be used for at least part of the DNN system 100 in FIG. 1. A number of components are illustrated in FIG. 10 as included in the computing device 1000, but any one or more of these components may be omitted or duplicated, as suitable for the application. In some embodiments, some or all of the components included in the computing device 1000 may be attached to one or more motherboards. In some embodiments, some or all of these components are fabricated onto a single system on a chip (SoC) die. Additionally, in various embodiments, the computing device 1000 may not include one or more of the components illustrated in FIG. 10, but the computing device 1000 may include interface circuitry for coupling to the one or more components. For example, the computing device 1000 may not include a display device 1006, but may include display device interface circuitry (e.g., a connector and driver circuitry) to which a display device 1006 may be coupled. In another set of examples, the computing device 1000 may not include an audio input device 1018 or an audio output device 1008, but may include audio input or output device interface circuitry (e.g., connectors and supporting circuitry) to which an audio input device 1018 or audio output device 1008 may be coupled.

The computing device 1000 may include a processing device 1002 (e.g., one or more processing devices). The processing device 1002 processes electronic data from registers and/or memory to transform that electronic data into other electronic data that may be stored in registers and/or memory. The computing device 1000 may include a memory 1004, which may itself include one or more memory devices such as volatile memory (e.g., DRAM), nonvolatile memory (e.g., read-only memory (ROM)), high bandwidth memory (HBM), flash memory, solid state memory, and/or a hard drive. In some embodiments, the memory 1004 may include memory that shares a die with the processing device 1002. In some embodiments, the memory 1004 includes one or more non-transitory computer-readable media storing instructions executable for occupancy mapping or collision detection, e.g., the method 900 described above in conjunction with FIG. 9 or some operations performed by the DNN system 100 in FIG. 1. The instructions stored in the one or more non-transitory computer-readable media may be executed by the processing device 1002.

In some embodiments, the computing device 1000 may include a communication chip 1012 (e.g., one or more communication chips). For example, the communication chip 1012 may be configured for managing wireless communications for the transfer of data to and from the computing device 1000. The term "wireless" and its derivatives may be used to describe circuits, devices, systems, methods, techniques, communications channels, etc., that may communicate data using modulated electromagnetic radiation through a nonsolid medium. The term does not imply that the associated devices do not contain any wires, although in some embodiments they might not.

The communication chip 1012 may implement any of a number of wireless standards or protocols, including but not limited to Institute for Electrical and Electronic Engineers (IEEE) standards including Wi-Fi (IEEE 802.10 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for worldwide interoperability for microwave access, which is a certification mark for products that pass conformity and interoperability tests for the IEEE 802.16 standards. The communication chip 1012 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 1012 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1012 may operate in accordance with code-division multiple access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1012 may operate in accordance with other wireless protocols in other embodiments. The computing device 1000 may include an antenna 1022 to facilitate wireless communications and/or to receive other wireless communications (such as AM or FM radio transmissions).

In some embodiments, the communication chip 1012 may manage wired communications, such as electrical, optical, or any other suitable communication protocols (e.g., the Ethernet). As noted above, the communication chip 1012 may include multiple communication chips. For instance, a first communication chip 1012 may be dedicated to shorter-range wireless communications such as Wi-Fi or Bluetooth, and a second communication chip 1012 may be dedicated to longer-range wireless communications such as global positioning system (GPS), EDGE, GPRS, CDMA, WiMAX, LTE, EV-DO, or others. In some embodiments, a first communication chip 1012 may be dedicated to wireless communications, and a second communication chip 1012 may be dedicated to wired communications.

The computing device 1000 may include battery/power circuitry 1014. The battery/power circuitry 1014 may include one or more energy storage devices (e.g., batteries or capacitors) and/or circuitry for coupling components of the computing device 1000 to an energy source separate from the computing device 1000 (e.g., AC line power).

The computing device 1000 may include a display device 1006 (or corresponding interface circuitry, as discussed above). The display device 1006 may include any visual indicators, such as a heads-up display, a computer monitor, a projector, a touchscreen display, a liquid crystal display (LCD), a light-emitting diode display, or a flat panel display, for example.

The computing device 1000 may include an audio output device 1008 (or corresponding interface circuitry, as discussed above). The audio output device 1008 may include any device that generates an audible indicator, such as speakers, headsets, or earbuds, for example.

The computing device 1000 may include an audio input device 1018 (or corresponding interface circuitry, as discussed above). The audio input device 1018 may include any device that generates a signal representative of a sound, such as microphones, microphone arrays, or digital instruments (e.g., instruments having a musical instrument digital interface (MIDI) output).

The computing device 1000 may include a GPS device 1016 (or corresponding interface circuitry, as discussed above). The GPS device 1016 may be in communication with a satellite-based system and may receive a location of the computing device 1000, as known in the art.

The computing device 1000 may include another output device 1010 (or corresponding interface circuitry, as discussed above). Examples of the other output device 1010 may include an audio codec, a video codec, a printer, a wired or wireless transmitter for providing information to other devices, or an additional storage device.

The computing device 1000 may include another input device 1020 (or corresponding interface circuitry, as discussed above). Examples of the other input device 1020 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The computing device 1000 may have any desired form factor, such as a handheld or mobile computer system (e.g., a cell phone, a smart phone, a mobile internet device, a music player, a tablet computer, a laptop computer, a netbook computer, an ultrabook computer, a personal digital assistant (PDA), an ultramobile personal computer, etc.), a desktop computer system, a server or other networked computing component, a printer, a scanner, a monitor, a set-top box, an entertainment control unit, a vehicle control unit, a digital camera, a digital video recorder, or a wearable computer system. In some embodiments, the computing device 1000 may be any other electronic device that processes data.

SELECTED EXAMPLES

The following paragraphs provide various examples of the embodiments disclosed herein.

Example 1 provides a computer-implemented method, including obtaining a graph that includes a collection of nodes connected by a plurality of edges; selecting one or more target nodes from the collection of nodes; forming a hierarchical sequence of node groups, each node group including one or more nodes in the graph, a first node group in the hierarchical sequence including the one or more target nodes, a subsequent node group including one or more nodes directly connected to at least one of one or more nodes in a node group that is immediately before the subsequent node group in the hierarchical sequence; generating a hierarchical adjacency matrix that includes a plurality of elements encoding at least a subset of the plurality of edges, the hierarchical adjacency matrix including a plurality of rows, each row representing a respective node in the graph, the plurality of rows arranged in the hierarchical adjacency matrix in accordance with the hierarchical sequence; and inputting the hierarchical adjacency matrix into a neural network, the neural network outputting an update in one or more embeddings of the one or more target nodes, an embedding encoding a characteristic of a target node.

Example 2 provides the computer-implemented method of example 1, where forming the hierarchical sequence of node groups includes forming a second node group including one or more second nodes, each of which is directly connected to at least one of the one or more target nodes in the graph; and forming a third node group including one or more third nodes, each of which is directly connected to at least one of the one or more second nodes in the graph.

Example 3 provides the computer-implemented method of example 1 or 2, where forming the hierarchical sequence of node groups includes determining a layer count of the neural network, the layer count indicating how many layers are present in the neural network; and forming the hierarchical sequence of node groups based on the layer count.

Example 4 provides the computer-implemented method of example 3, where a number of node groups in the hierarchical adjacency matrix is equal to the layer count.

Example 5 provides the computer-implemented method of any of the preceding examples, where generating the hierarchical adjacency matrix includes retrieving, from a memory, an adjacency matrix in a compressed format, the adjacency matrix in the compressed format including one or more values that represent one or more of the plurality of edges in the graph; and determining values of the plurality of elements in the hierarchical adjacency matrix based on the adjacency matrix in a compressed format.

Example 6 provides the computer-implemented method of any of the preceding examples, where inputting the hierarchical adjacency matrix into the neural network includes inputting different portions of the hierarchical adjacency matrix into different layers of the neural network.

Example 7 provides the computer-implemented method of example 6, where the neural network includes a sequence of layers that includes a first layer, a last layer, and one or more other layers arranged between the first layer and the last layer, and inputting the different portions of the hierarchical adjacency matrix into the different layers of the neural network includes inputting the plurality of elements of the hierarchical adjacency matrix into the first layer; and inputting a subset of the plurality of elements into the second layer.

Example 8 provides one or more non-transitory computer-readable media storing instructions executable to perform operations, the operations including obtaining a graph that includes a collection of nodes connected by a plurality of edges; selecting one or more target nodes from the collection of nodes; forming a hierarchical sequence of node groups, each node group including one or more nodes in the graph, a first node group in the hierarchical sequence including the one or more target nodes, a subsequent node group including one or more nodes directly connected to at least one of one or more nodes in a node group that is immediately before the subsequent node group in the hierarchical sequence; generating a hierarchical adjacency matrix that includes a plurality of elements encoding at least a subset of the plurality of edges, the hierarchical adjacency matrix including a plurality of rows, each row representing a respective node in the graph, the plurality of rows arranged in the hierarchical adjacency matrix in accordance with the hierarchical sequence; and inputting the hierarchical adjacency matrix into a neural network, the neural network outputting an update in one or more embeddings of the one or more target nodes, an embedding encoding a characteristic of a target node.

Example 9 provides the one or more non-transitory computer-readable media of example 8, where forming the hierarchical sequence of node groups includes forming a second node group including one or more second nodes, each of which is directly connected to at least one of the one or more target nodes in the graph; and forming a third node group including one or more third nodes, each of which is directly connected to at least one of the one or more second nodes in the graph.

Example 10 provides the one or more non-transitory computer-readable media of example 8 or 9, where forming the hierarchical sequence of node groups includes determining a layer count of the neural network, the layer count indicating how many layers are present in the neural network; and forming the hierarchical sequence of node groups based on the layer count.

Example 11 provides the one or more non-transitory computer-readable media of example 10, where a number of node groups in the hierarchical adjacency matrix is equal to the layer count.

Example 12 provides the one or more non-transitory computer-readable media of any one of examples 8-11, where generating the hierarchical adjacency matrix includes retrieving, from a memory, an adjacency matrix in a compressed format, the adjacency matrix in the compressed format including one or more values that represent one or more of the plurality of edges in the graph; and determining values of the plurality of elements in the hierarchical adjacency matrix based on the adjacency matrix in a compressed format.

Example 13 provides the one or more non-transitory computer-readable media of any one of examples 8-12, where inputting the hierarchical adjacency matrix into the neural network includes inputting different portions of the hierarchical adjacency matrix into different layers of the neural network.

Example 14 provides the one or more non-transitory computer-readable media of example 13, where the neural network includes a sequence of layers that includes a first layer, a last layer, and one or more other layers arranged between the first layer and the last layer, and inputting the different portions of the hierarchical adjacency matrix into the different layers of the neural network includes inputting the plurality of elements of the hierarchical adjacency matrix into the first layer; and inputting a subset of the plurality of elements into the second layer.

Example 15 provides an apparatus, including a computer processor for executing computer program instructions; and a non-transitory computer-readable memory storing computer program instructions executable by the computer processor to perform operations including obtaining a graph that includes a collection of nodes connected by a plurality of edges, selecting one or more target nodes from the collection of nodes, forming a hierarchical sequence of node groups, each node group including one or more nodes in the graph, a first node group in the hierarchical sequence including the one or more target nodes, a subsequent node group including one or more nodes directly connected to at least one of one or more nodes in a node group that is immediately before the subsequent node group in the hierarchical sequence, generating a hierarchical adjacency matrix that includes a plurality of elements encoding at least a subset of the plurality of edges, the hierarchical adjacency matrix including a plurality of rows, each row representing a respective node in the graph, the plurality of rows arranged in the hierarchical adjacency matrix in accordance with the hierarchical sequence, and inputting the hierarchical adjacency matrix into a neural network, the neural network outputting an update in one or more embeddings of the one or more target nodes, an embedding encoding a characteristic of a target node.

Example 16 provides the apparatus of example 15, where forming the hierarchical sequence of node groups includes forming a second node group including one or more second nodes, each of which is directly connected to at least one of the one or more target nodes in the graph; and forming a third node group including one or more third nodes, each of which is directly connected to at least one of the one or more second nodes in the graph.

Example 17 provides the apparatus of example 15 or 16, where forming the hierarchical sequence of node groups includes determining a layer count of the neural network, the layer count indicating how many layers are present in the neural network; and forming the hierarchical sequence of node groups based on the layer count.

Example 18 provides the apparatus of any one of examples 15-17, where generating the hierarchical adjacency matrix includes retrieving, from a memory, an adjacency matrix in a compressed format, the adjacency matrix in the compressed format including one or more values that represent one or more of the plurality of edges in the graph; and determining values of the plurality of elements in the hierarchical adjacency matrix based on the adjacency matrix in a compressed format.

Example 19 provides the apparatus of any one of examples 15-18, where inputting the hierarchical adjacency matrix into the neural network includes inputting different portions of the hierarchical adjacency matrix into different layers of the neural network.

Example 20 provides the apparatus of example 19, where the neural network includes a sequence of layers that includes a first layer, a last layer, and one or more other layers arranged between the first layer and the last layer, and inputting the different portions of the hierarchical adjacency matrix into the different layers of the neural network includes inputting the plurality of elements of the hierarchical adjacency matrix into the first layer; and inputting a subset of the plurality of elements into the second layer.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

The invention claimed is:

1. A computer-implemented method, comprising:

obtaining a graph that comprises a collection of nodes connected by a plurality of edges;

selecting one or more target nodes from the collection of nodes;

forming a hierarchical sequence of node groups, each node group comprising one or more nodes in the graph, a first node group in the hierarchical sequence comprising the one or more target nodes, a subsequent node group comprising one or more nodes directly connected to at least one of one or more nodes in a node group that is immediately before the subsequent node group in the hierarchical sequence;

generating a hierarchical adjacency matrix that comprises a plurality of elements encoding at least a subset of the plurality of edges, the hierarchical adjacency matrix comprising a plurality of rows, each row representing a respective node in the graph, the plurality of rows arranged in the hierarchical adjacency matrix in accordance with the hierarchical sequence wherein generating the hierarchical adjacency matrix comprises:

obtaining a compressed adjacency matrix, wherein the compressed adjacency matrix comprises a first vector indicating a number of nonzero elements in each row of an adjacency matrix of the graph and a second vector indicating one or more values of at least one of the plurality of edges, and determining values of the plurality of elements in the hierarchical adjacency matrix based on the compressed adjacency matrix; and inputting the hierarchical adjacency matrix into a neural network, wherein the neural network comprises a sequence of layers that includes a first layer and a second layer arranged after the first layer, wherein inputting the hierarchical adjacency matrix into the neural network comprises inputting different portions of the hierarchical adjacency matrix into different layers of the neural network by, inputting the plurality of elements in the hierarchical adjacency matrix into the first layer; and inputting a subset of the plurality of elements into the second layer, and wherein the neural network outputs an update in one or more embeddings of the one or more target nodes, an embedding encoding a characteristic of a target node.

2. The computer-implemented method of claim 1, wherein forming the hierarchical sequence of node groups comprises:

forming a second node group comprising one or more second nodes, each of which is directly connected to at least one of the one or more target nodes in the graph; and forming a third node group comprising one or more third nodes, each of which is directly connected to at least one of the one or more second nodes in the graph.

3. The computer-implemented method of claim 1, wherein forming the hierarchical sequence of node groups comprises:

determining a layer count of the neural network, the layer count indicating how many layers are present in the neural network; and forming the hierarchical sequence of node groups based on the layer count.

4. The computer-implemented method of claim 3, wherein a number of node groups in the hierarchical adjacency matrix is equal to the layer count.

5. One or more non-transitory computer-readable media storing instructions executable to perform operations, the operations comprising:

obtaining a graph that comprises a collection of nodes connected by a plurality of edges;

selecting one or more target nodes from the collection of nodes;

forming a hierarchical sequence of node groups, each node group comprising one or more nodes in the graph, a first node group in the hierarchical sequence comprising the one or more target nodes, a subsequent node group comprising one or more nodes directly connected to at least one of one or more nodes in a node group that is immediately before the subsequent node group in the hierarchical sequence;

generating a hierarchical adjacency matrix that comprises a plurality of elements encoding at least a subset of the plurality of edges, the hierarchical adjacency matrix comprising a plurality of rows, each row representing a respective node in the graph, the plurality of rows arranged in the hierarchical adjacency matrix in accordance with the hierarchical sequence wherein generating the hierarchical adjacency matrix comprises:

obtaining a compressed adjacency matrix, wherein the compressed adjacency matrix comprises a first vector indicating a number of nonzero elements in each row of an adjacency matrix of the graph and a second vector indicating one or more values of at least one of the plurality of edges, and determining values of the plurality of elements in the hierarchical adjacency matrix based on the compressed adjacency matrix; and inputting the hierarchical adjacency matrix into a neural network, wherein the neural network comprises a sequence of layers that includes a first layer and a second layer arranged after the first layer, wherein inputting the hierarchical adjacency matrix into the neural network comprises inputting different portions of the hierarchical adjacency matrix into different layers of the neural network by inputting the plurality of elements in the hierarchical adjacency matrix into the first layer; and inputting a subset of the plurality of elements into the second layer, and wherein the neural network outputs an update in one or more embeddings of the one or more target nodes, an embedding encoding a characteristic of a target node.

6. The one or more non-transitory computer-readable media of claim 5, wherein forming the hierarchical sequence of node groups comprises:

forming a second node group comprising one or more second nodes, each of which is directly connected to at least one of the one or more target nodes in the graph; and forming a third node group comprising one or more third nodes, each of which is directly connected to at least one of the one or more second nodes in the graph.

7. The one or more non-transitory computer-readable media of claim 5, wherein forming the hierarchical sequence of node groups comprises:

determining a layer count of the neural network, the layer count indicating how many layers are present in the neural network; and forming the hierarchical sequence of node groups based on the layer count.

8. The one or more non-transitory computer-readable media of claim 7, wherein a number of node groups in the hierarchical adjacency matrix is equal to the layer count.

9. An apparatus, comprising:

a computer processor for executing computer program instructions; and a non-transitory computer-readable memory storing computer program instructions executable by the computer processor to perform operations comprising:

obtaining a graph that comprises a collection of nodes connected by a plurality of edges, selecting one or more target nodes from the collection of nodes, forming a hierarchical sequence of node groups, each node group comprising one or more nodes in the graph, a first node group in the hierarchical sequence comprising the one or more target nodes, a subsequent node group comprising one or more nodes directly connected to at least one of one or more nodes in a node group that is immediately before the subsequent node group in the hierarchical sequence, generating a hierarchical adjacency matrix that comprises a plurality of elements encoding at least a subset of the plurality of edges, the hierarchical adjacency matrix comprising a plurality of rows, each row representing a respective node in the graph, the plurality of rows arranged in the hierarchical adjacency matrix in accordance with the hierarchical sequence, wherein generating the hierarchical adjacency matrix comprises:

obtaining a compressed adjacency matrix, wherein the compressed adjacency matrix comprises a first vector indicating a number of nonzero elements in each row of an adjacency matrix of the graph and a second vector indicating one or more values of at least one of the plurality of edges, and determining values of the plurality of elements in the hierarchical adjacency matrix based on the compressed adjacency matrix, and inputting the hierarchical adjacency matrix into a neural network, wherein the neural network comprises a sequence of layers that includes a first layer and a second layer arranged after the first layer, wherein inputting the hierarchical adjacency matrix into the neural network comprises inputting different portions of the hierarchical adjacency matrix into different layers of the neural network by inputting the plurality of elements in the hierarchical adjacency matrix into the first layer; and inputting a subset of the plurality of elements into the second layer, and wherein the neural network outputs an update in one or more embeddings of the one or more target nodes, an embedding encoding a characteristic of a target node.

10. The apparatus of claim 9, wherein forming the hierarchical sequence of node groups comprises:

forming a second node group comprising one or more second nodes, each of which is directly connected to at least one of the one or more target nodes in the graph; and forming a third node group comprising one or more third nodes, each of which is directly connected to at least one of the one or more second nodes in the graph.

11. The apparatus of claim 9, wherein forming the hierarchical sequence of node groups comprises:

determining a layer count of the neural network, the layer count indicating how many layers are present in the neural network; and forming the hierarchical sequence of node groups based on the layer count.

* * * * *